United States Patent [19]

DeMond et al.

[11] Patent Number: 5,170,156
[45] Date of Patent: Dec. 8, 1992

[54] MULTI-FREQUENCY TWO DIMENSIONAL DISPLAY SYSTEM

[75] Inventors: Thomas W. DeMond, Richardson; E. Earle Thompson, Dallas, both of Tex.

[73] Assignee: Texas Instruments Incorporated, Dallas, Tex.

[21] Appl. No.: 709,088

[22] Filed: May 30, 1991

Related U.S. Application Data

[63] Continuation of Ser. No. 315,952, Feb. 27, 1989, abandoned.

[51] Int. Cl.[5] .............................................. G09G 3/00
[52] U.S. Cl. ................................... 340/794; 340/795; 340/783
[58] Field of Search ............... 340/705, 783, 794, 795, 340/763, 764, 702; 358/56, 61, 62, 63, 88, 90, 231–236; 359/212, 629, 865, 478; 353/29, 30, 31

[56] References Cited

U.S. PATENT DOCUMENTS

| | | |
|---|---|---|
| 3,474,248 | 10/1969 | Brown . |
| 3,576,394 | 4/1972 | Lee . |
| 3,701,586 | 10/1972 | Goetz ................................. 358/90 |
| 3,918,002 | 11/1975 | Leuschner . |
| 3,968,440 | 7/1976 | Ehni, III . |
| 3,986,022 | 10/1976 | Hyatt . |
| 4,023,158 | 5/1977 | Corcoran . |
| 4,031,474 | 6/1977 | Ehni, III et al. . |
| 4,041,476 | 8/1977 | Swainson . |
| 4,063,233 | 12/1977 | Rowe . |
| 4,078,229 | 3/1978 | Swanson et al. . |
| 4,093,921 | 6/1978 | Buss . |
| 4,093,922 | 6/1978 | Buss . |
| 4,168,509 | 9/1979 | Hartmann . |
| 4,275,648 | 6/1981 | Mouri et al. . |
| 4,288,861 | 9/1981 | Swainson et al. . |
| 4,380,023 | 4/1983 | Mir et al. . |
| 4,441,791 | 4/1984 | Hornbeck . |
| 4,471,385 | 9/1984 | Hyatt . |
| 4,552,441 | 11/1985 | Dewey . |
| 4,577,282 | 3/1986 | Caudel et al. . |
| 4,596,992 | 6/1986 | Hornbeck . |
| 4,611,889 | 9/1986 | Buzak . |
| 4,613,201 | 9/1986 | Shortle et al. . |
| 4,615,595 | 10/1986 | Hornbeck . |
| 4,638,309 | 1/1987 | Ott . |
| 4,662,746 | 5/1987 | Hornbeck . |
| 4,671,634 | 6/1987 | Kizaki et al. . |
| 4,680,579 | 7/1987 | Ott . |
| 4,699,498 | 10/1987 | Naemura et al. . |
| 4,710,732 | 12/1987 | Hornbeck . |
| 4,713,749 | 12/1987 | Magar et al. . |
| 4,749,259 | 6/1988 | Ledebuhr . |
| 4,755,869 | 7/1988 | Tanaka . |

OTHER PUBLICATIONS

Applied Optics and Optical Engineering, Kingslake, Rudolf, Ed. vol. II. p. 62. 1965.

Coherent Optical Engineering, Arecchi, F. T., Ed. pp. 129–147. 1977.

Texas Instruments, "Digital Signal Processing Products and Applications Primer" 1988.

Budinger, "An analysis of 3-D display strategies", Proceedings of Society of Photo-Optical Instruments Engineering, vol. 507 (1984), pp. 2–8.

I.E.E.E. Transactions on Sonics and Utrasonics, vol. su-23, No. 1, Jan. 1976, pp. 2–22.

Yamada et al, "Investigation of 3-D display Using Optical Fiber Sheets", pp. 372–379.

SPIE vol. 120 (Three-Dimensional Imaging, 1977), pp. 62–67, "Present and Potential Capabilities of Three-Dimensional Displays Using Sequential Excitation of Fluorescence" by Carl M. Verber.

(List continued on next page.)

Primary Examiner—Jeffery A. Brier

Attorney, Agent, or Firm—Julie L. Reed; James C. Kesterson; Richard L. Donaldson

[57] ABSTRACT

A digitized video system having a display including one or more multi-frequency sensitive materials and a spatial lighy modulator simultaneously directing a plurality individual beams from an energy source onto the display.

17 Claims, 18 Drawing Sheets

OTHER PUBLICATIONS

IEEE Transactions on Electron Devices, vol. ED-18, No. 9 (Sep. 1971), pp. 724–732, "A True Three-Dimensional Display" by Jordan D. Lewis et al.

Journal of the Optical Society of America, vol. 66(11), 1976, p. 1316, "Topical issue on laser speckle" by N. George and D. C. Sinclair.

Applications of Optical Coherence (W. H. Carter, Ed.), 1979, pp. 86–94, "Role of coherence concepts in the study of speckle" by J. W. Goodman.

Coherent Optical Engineering (F. T. Arecchi and V. Degiorgio, Eds.), 1977, pp. 129–149, "Speckle interferometry" by A. E. Ennos.

Journal of the Optical Society of America: Part A, vol. 5 (10), 1988, pp. 1767–1771, "Effect of luminance of photooptic visual acuity in the presence of laser speckle" by J. M. Artigas and A. Felipe.

Optics Communications, vol. 3(1), 1971, "Elimination of granulation in laser beam projections by means of moving diffusers" by E. Schroder.

SID Int. Symp. Digest, Paper 10.1, May 1983, "Projection Display of Radar Image using Gas Laser and Organic Fluorescent Pigment Screen" by H. Yamada, M. Ishida, M. Ito, Y. Hagino and K. Miyaji.

Information Display, Nov./Dec., 1965, pp. 10–20, "The Three Dimensional Display Its Cues and Techniques" by Petro Vlahos.

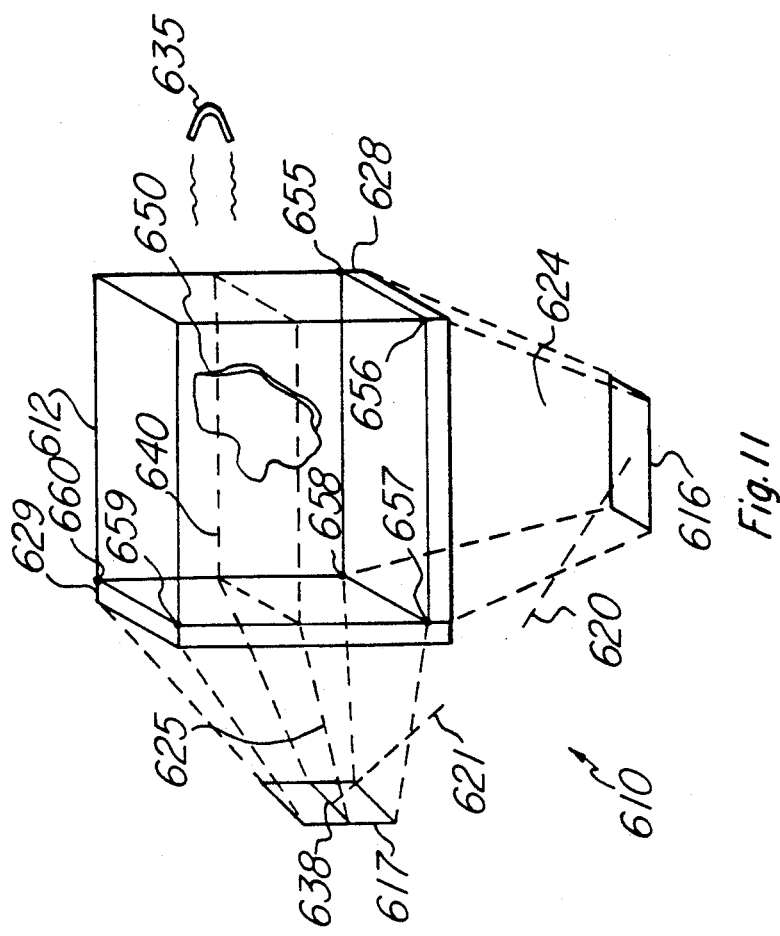
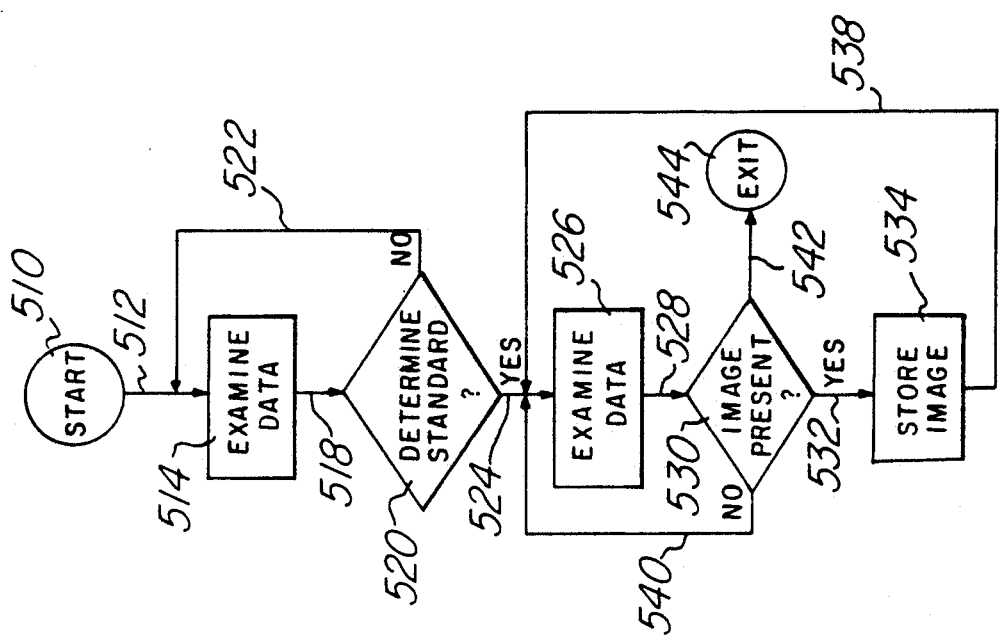
Fig. 11
Fig. 10

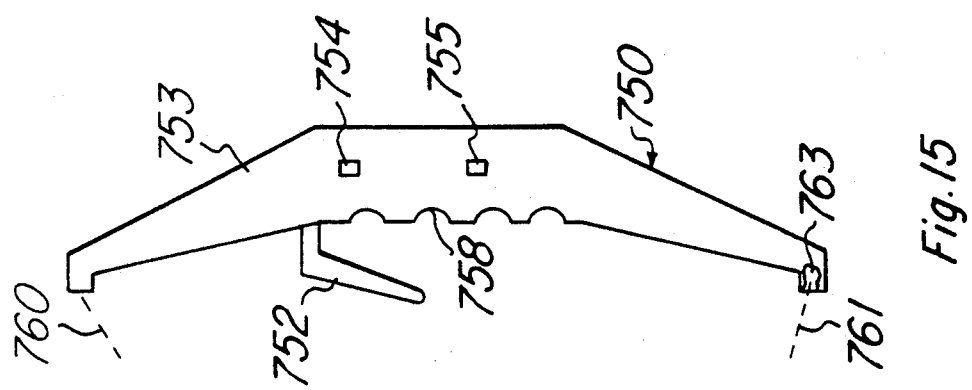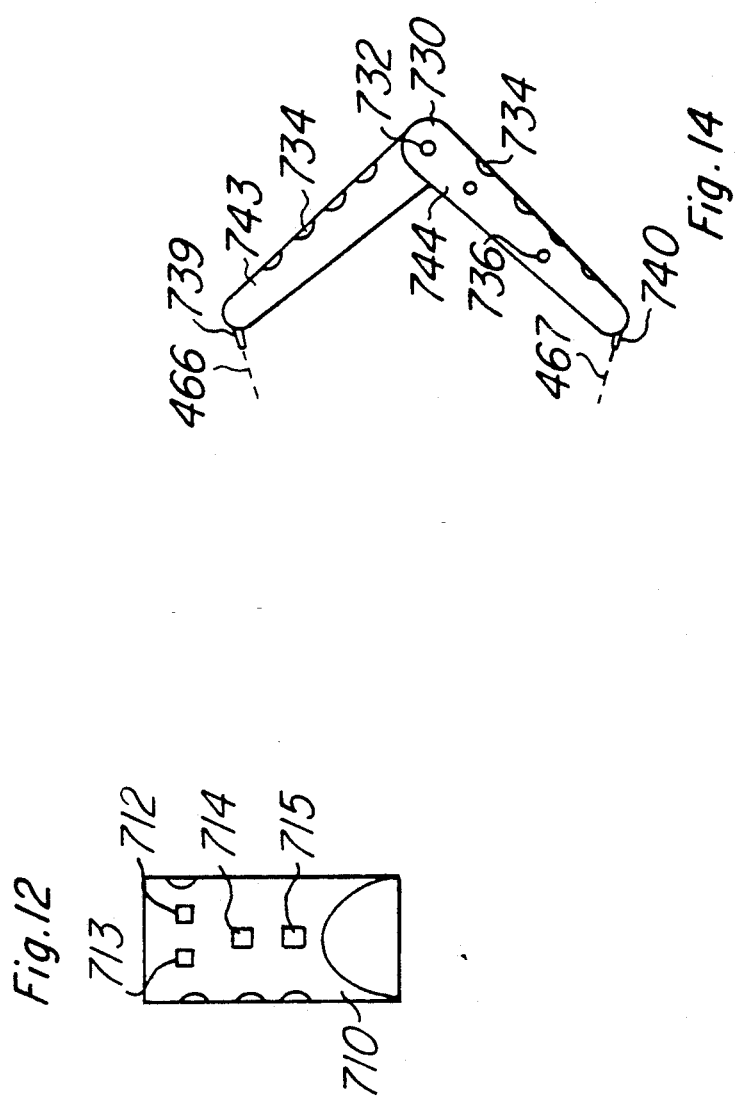

MULTI-FREQUENCY TWO DIMENSIONAL DISPLAY SYSTEM

CROSS-REFERENCE TO RELATED APPLICATIONS

This application is a continuation of application Ser. No. 07/315,952 filed Feb. 27, 1989 now abandoned Ser. No. 725,231, filed Jun. 26, 1991, "Spatial Light Modulator Projection System with Random Polarity Light" by E. Earle Thompson, and Thomas W. DeMond, (Continuation of Ser. No. 315,634, filed Feb. 27, 1989;

Ser. No. 711,495, filed May 30, 1991, "Digitized Color Video System" by E. Earle Thompson, and Thomas W. DeMond, (Continuation of Ser. No. 315,633, filed Feb. 27, 1989);

Ser. No. 711,558, filed May 30, 1991, "Apparatus and Method for Image Projection" by E. Earle Thompson, and Thomas W. DeMond, (Continuation of Ser. No. 315,632, filed Feb. 27, 1989);

Ser. No. 709,090, filed May 30, 1991, "Variable Luminosity Display System" by E. Earle Thompson, and Thomas W. DeMond, (continuation of Ser. No. 315,659, filed Feb. 27, 1989);

Ser. No. 709,089, filed May 30, 1991, "Digitized Video System Utilizing a Moving Display Surface" by E. Earle Thompson, and Thomas W. DeMond, (continuation of Ser. No. 317,885, filed Feb. 27, 1989);

Ser. No. 725,234, filed Jun. 26, 1991, "Planarized Three Dimensional Display" by E. Earle Thompson, and Thomas W. DeMond, (continuation of Ser. No. 315,631, filed Feb. 27, 1989);

Ser. No. 711,088, filed May 30, 1991, "Digitized Color Video System" by E. Earle Thompson, and Thomas W. DeMond, (continuation of Ser. No. 315,952, filed Feb. 27, 1989);

U.S. Pat. No. 5,079,544, issued Jan. 7, 1992;

Ser. No. 709,087, filed May 30, 1991, "Multi-Dimensional Array Video Processor System" by E. Earle Thompson, and Thomas W. DeMond, (continuation of Ser. No. 315,660, filed Feb. 27, 1989);

Ser. No. 315,366, filed Feb. 27, 1989, "Pointer for Three Dimensional Display" by E. Earle Thompson, and Thomas W. DeMond;

Ser. No. 725,907, filed Jul. 3, 1991, "Spatial Light Modulator and Memory for Digitized Video Display" by E. Earle Thompson, and Thomas W. DeMond, (continuation Ser. No. 315,639, filed Feb. 27, 1989);

Ser. No. 315,939, filed Feb. 27, 1989, APPARATUS AND METHOD FOR DIGITIZED VIDEO SYSTEM by E. Earle Thompson and Thomas W. DeMond;

Ser. No. 725,232, filed Jun. 26, 1991, "Mirror Magnified Video Display" by E. Earle Thompson and Thomas W. DeMond, (continuation of Ser. No. 315,745, filed Feb. 27, 1989);

Ser. No. 315,861, filed Feb. 27, 1989, Video Display System by Thomas W. DeMond and E. Earle Thompson, which are incorporated by reference hereinto.

BACKGROUND OF THE INVENTION

1. Field of the Invention

The present invention relates to apparatus and methods for manufacturing digitized video systems and integrated circuits and devices therefor.

2. Description of the Prior Art

The present invention is useful in the field of graphics and video display systems such as displays for computer systems, terminals and televisions. Recently there has occurred a large demand for larger and/or higher resolution viewing surfaces than can be provided by conventional video display devices such as cathode ray tubes (CRTs) or liquid crystal displays (LCDs). This has been driven by consumer demands for larger televisions (TVs) and by the need for large audience viewing of either shows or computer generated screens in conferences.

LCDs, which are used for small computer systems and terminals, especially for laptop and portable computers, use individual liquid crystal cells for each pixel on the LCD. LCDs are temperature sensitive, difficult to produce in large sizes, slow in changing state, and require external light sources for viewing.

To overcome the size limitation of LCDs, there have been attempts to construct projection systems using an LCD as a spatial light modulator (SLM). Unfortunately, several problems still remain. The LCD is inherently slow and thus a rapidly changing image will "smear". The resolution of the LCD is restricted by the drive complexity. Further, the drive complexity also requires that the size of the LCD will generally be proportionally related to the resolution. This means that the projection optics will have to be large and correspondingly expensive for a high-resolution system. Another problem is that the light transmitted through (or reflected from) the LCD will be polarized. This may result in non-linear perception of brightness from the center of vision to the periphery.

The most popular display system is the CRT. In a cathode ray tube, a scanning electron beam having a varying current density, is scanned across a light emitting phosphor screen. This light emitting phosphor screen is bombarded by the electron beam and produces light in relation to the magnitude of the current density of the electron beam. These may also be used in a direct view or projection mode. However, these suffer from various disadvantages. The first of these is cost.

The higher cost is dictated by the difficulties in constructing large display tubes (at present there are 45 inch tubes being manufactured). Another reason for the cost is the huge amount of raw materials (in particular the glass) required. This translates to a very heavy display that is not easily transportable.

Resolution is also a problem for CRTs. There are two major reasons for this. The first relates to the shadow mask used in color CRTs. A shadow mask is used to separate the color phosphors used to generate the three primary colors (red, blue, and green), and to help guide the electron beam used to excite the phosphors. The brightness of a pixel is related to the size of the phosphor spot. However, as the phosphor spot size is increased, the shadow mask must be made larger and becomes more visible. Brightness is also related to the drive from the electron beam. As the drive increases, so does the brightness. Unfortunately, the shadow mask is also sensitive to the electron beam and will thermally distort under high drive. The image is then blurred both by the shadow mask becoming more visible and by the electron beam being deflected toward an unwanted phosphor.

The second resolution limiter is rastering. All pixels to be illuminated are sequentially scanned by an electron beam. This beam is swept in a raster back and forth across the phosphors. In general, the beam is turned off when tracing back across the phosphors (known as the retrace time) and is also turned off when returning to the starting point (vertical blanking interval). While this is not a theoretical limitation (all phosphor points can be accessed), it is a practical limitation. This is because the fluorescence of the phosphors begin decaying as soon as the electron beam moves to the next location. The electron beam must return before the human eye can perceive the decay or else the display will flicker. Longer persistence phosphors can be used to compensate, but they suffer from a smear effect when the display data changes.

Rastering has another insidious side-effect. It places an upper limit on the perceived brightness of a display. As discussed above, a phosphor can only be driven for a very short period of time, and will then start to decay. If the phosphor is driven hard, then it will start to bloom (i.e. it will start to excite neighboring pixel locations) and blur the display. If the phosphor was continuously excited for an extended time, it would appear to be brighter than if it was excited only for the raster period. This is because the human eye has an integration time of approximately 0.1 seconds for bright sources of light and approximately 0.2 seconds for dimmer sources.

Projection CRT based systems do not suffer from the shadow mask problems. However they are expensive as they usually require three CRTs (one each of red, blue, and green). Also, they suffer badly from low brightness (due to having expand the image generated). This is particularly true when a single CRT is used in a projection mode. Either type has all of the other raster related problems. In addition, when used in back-projection configurations, they are very large due to the complex optical paths required.

Another drawback to conventional display systems is that they are primarily analog. Even if the information to be displayed is stored in digital form as in a computer, it must be converted to an analog raster scan before it can be displayed on the cathode ray tube.

Other spatial light modulators have been used in projection displays. For example, the use of a spatial light modulator drive for in a display system is shown in U.S. Pat. Nos. 4,638,309 and 4,680,579 issued to Ott and incorporated by reference hereinto. In Ott, a semiconductor deformable mirror device, in conjunction with a Schlieren optical device, is used to form the spatial light modulator. Deformable mirror devices are shown in U.S. Pat. Nos. 4,441,791, 4,710,732, 4,596,992, 4,615,595, and 4,662,746, and U.S. Pat. No. 5,061,049 issued Oct. 19, 1991 by Hornbeck, all of which are incorporated by reference hereinto.

Another display utilizing a light valve is shown in U.S. Pat. No. 3,576,394 by Lee, which is incorporated by reference hereinto. Various types of human factors information on critical flicker frequency is shown in "Applied Optics and Optical Engineering" (1965), Volume II (The Detection of Light and Infrared Radiation), by Rudolf Kingslake, which is incorporated by reference hereinto. Acousto-optic spectral filters are shown in I.E.E.E. Transactions on Sonics and Ultrasonics, vol. su-23, No. 1, January 1976, pages 2–22, which is incorporated by reference hereinto.

A HDTV (High Density TeleVision) system is shown in U.S. Pat. No. 4,168,509 by Hartman, which is incorporated by reference hereinto. Various types of electronic TV tuners are shown in U.S. Pat. Nos. 3,918,002, 3,968,440, 4,031,474, 4,093,921, and 4,093,922, which are incorporated by reference hereinto. Various multi-frequency sensitive materials for displays are shown in SPIE vol. 120 (Three-Dimensional Imaging, 1977), pages 62–67, "PRESENT AND POTENTIAL CAPABILITIES OF THREE-DIMENSIONAL DISPLAYS USING SEQUENTIAL EXCITATION OF FLUORESCENCE" by Carl M. Verber; and IEEE Transactions on Electron Devices, Vol. ED.-18, No. 9 (Sep. 1971), pages 724–732, "A True Three-Dimensional Display" by Jordan D. Lewis et al, which are incorporated by reference hereinto. A type of Display is shown in Information Display, November/December, 1965, pages 10–20, "Three Dimensional Display Its Cues and Techniques" by Petro Vlahos, which is incorporated by reference hereinto.

Laser (Light Amplification by Stimulated Emission of Radiation) based projection systems are well known in the art. These systems may also use fluorescing pigments with non-visible laser light. This is shown in SID INT. SYMP. DIGEST, Paper 10.1, May 1983, "Projection Display of Radar Image using Gas Laser and Organic Fluorescent Pigment Screen" by H. Yamada, M. Ishida, M. Ito, Y. Hagino and K. Miyaji, which is herein incorporated by reference. More details on various pigments may be found in CHEMISTRY AND CHEMICAL INDUSTRY, Vol. 23, No. 3, 1970, "Increasing Application Field for Fluorescent Pigment" by R. Takano, which is herein incorporated by reference.

Laser based displays operate by deflecting a beam of coherent light generated by a laser so as to form an image. The deflectors include devices such as spinning mirrors and acousto-modulated deflectors. There are a number of problems with these projectors that have prevented them from becoming commercially feasible.

The first of these problems is flicker, which also places an upper limit on the resolution (i.e. number of pixels displayable) obtainable. Only one point of light (pixel) can be displayed at any given moment due to the nature of the deflectors. Also, there is no persistence to the display as these projectors generally direct the light onto a diffusion surface which have no means of continuing to emit light after the light is deflected away. This means that all points to be displayed must be illuminated within a time period less than the critical flicker frequency (CFF) of the human eye.

A second problem is laser speckle. This is considered to be a random interference pattern of intensity which results from the reflection or transmission of highly coherent light from (or through) an optically rough surface (one whose local irregularities in depth are greater than one quarter of a wavelength). This phenomenon is dealt with in JOURNAL OF THE OPTICAL SOCIETY OF AMERICA, Vol. 66(11), 1976, page 1316, "Topical issue on laser speckle" by N. George and D. C. Sinclair; APPLICATIONS OF OPTICAL COHERENCE (W. H. Carter, Ed.), 1979, pages 86–94, "Role of coherence concepts in the study of speckle" by J. W. Goodman; and COHERENT OPTICAL ENGINEERING (F. T. Arecchi and V. Degiorgio, Eds.), 1977, pages 129–149, "Speckle interferometry" by A. E. Ennos, all of which are incorporated herein by reference. Techniques for reduction of speckle are also shown in JOURNAL OF THE OPTICAL SOCIETY OF AMERICA: PART A, Vol. 5(10), 1988, pages 1767–1771, "Effect of luminance on photoptic visual acuity in the presence of laser speckle" by J. M. Artigas and A. Felipe and OPTICS COMMUNICATIONS, Vol. 3(1), 1971, "Elimination of granulation in laser beam projections by means of moving diffusers" by E, Schroder, all of which are incorporated herein by reference.

Another problem has been the generation of color images. This requires the use of multi-colored lasers. There are great technical difficulties in both aligning multiple deflectors and in keeping them synchronized so as to simultaneously image the different colors at a given pixel location.

As shown in the above articles and Patents there have been attempts to implement three dimensional displays. None of these constructions provides a practical true three dimensional display. Further, as shown in the above articles there have been attempts to implement two dimensional displays using light valves, lasers, and deformable mirror devices. None of these constructions provides a two dimensional display which is adaptable to many different TV and computer display formats and provides a fully digitized video display system using deformable mirror devices.

SUMMARY OF THE INVENTION

The preferred embodiments shown herein show various concepts in the field of digitized video systems for two and three dimensional images. A deformable mirror device is shown which is capable of receiving an image or a part of an image for display while displaying another image or another part of the image. A true 3 dimensional video display system has a display which can be either solid or gaseous.

It is an advantage of the present invention to provide a large, cost effective video display device.

It is an advantage of the invention to provide a light weight video display device.

It is an advantage of the invention to eliminate the shadow mask.

It is an advantage of the present invention to eliminate rastering for the visual display of images.

It is an advantage of the invention to have a compact back-projection video display system.

It is an advantage of the present invention to substantially reduce laser "speckle".

It is an advantage of the present invention to provide a fully digitized video system which is capable of displaying two and three dimensional images from inputs of many different formats.

It is a further advantage of the present invention to provide a fully digitized video display which is suitable for using in hostile environments.

It is another advantage of the present invention to provide an electronic system for a digitized video systems which adaptable to several different types of display.

Other and further advantages are set forth within and toward the end of the Description of the Preferred Embodiment.

BRIEF DESCRIPTION OF THE DRAWINGS

The present invention will be described with reference to the accompanying drawings, wherein:

FIG. 10 is a flow for the electronics of FIG. 3;

FIG. 11 show a three dimensional digitized display system;

FIGS. 12 and 13 show a pointer for the system of FIG. 11;

FIG. 14 shows a pointer for the system of FIG. 11;

FIG. 15 shows a pointer for the system of FIG. 11;

DESCRIPTION OF THE PREFERRED EMBODIMENTS

Figure 1A:
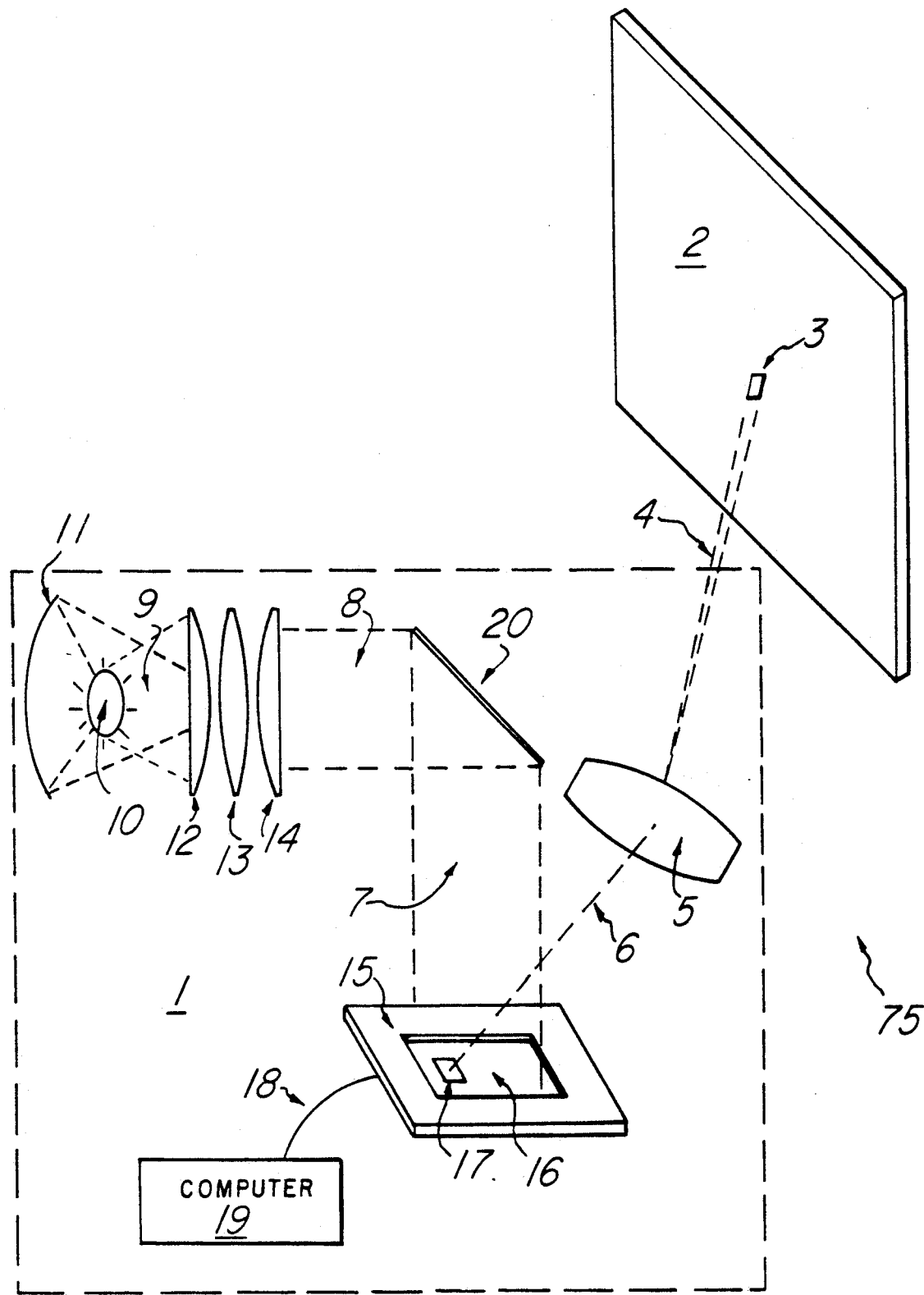
FIGS. 1a, 1b, 1c, and 1d shows a two dimensional digital video system utilizing a deformable mirror device.

FIGS. 1a, 1b, 1c, and 1d show a preferred embodiment of a two dimensional digitized video system 75, which has an image generating system 1 and display screen 2. The display screen 2 may be a relatively flat sheet of an appropriate material, or it may be of curved configuration so as to concentrate the reflected light toward a viewer. Optionally, the display screen 2 may be translucent so as to allow for back projection. In the reflective (or front projection) mode, the display screen 2 may be composed of a rigid material such as plastic, metal, etc. and have a reflective surface. The surface may be a matte finish or lenticular pattern as is well known in the art. In the back projection mode, the display screen 2 may be composed of glass or a translucent plastic and may have a patterned surface so as to partially diffuse the light impinging on it from image generating system 1. Back-projection screens of this type are well-known in the art.

A light source 10 is used to generate light energy for ultimate illumination of display screen 2. The light source 10 may be of conventional structure such as incandescent, halogen, arc, or other suitable form. Light 9 generated is further concentrated and directed toward lens 12 by mirror 11. The mirror 11 may be of any suitable shape such as parabolic, ellipsoid, etc.

Lens 12, 13, and 14 form a beam columnator operative to columnate light 9 into a column of light 8. This is done so as to concentrate the light energy and increase the efficiency of the overall system. Fold mirror 20 is used to direct the columnated light 8 onto a spatial light modulator (SLM) 15 via path 7. Other structures may of course be used so as to direct a source of concentrated light energy onto SLM 15 without departing from the invention.

SLM 15 is operative to selectively redirect portions of light from path 7 toward enlarger lens 5 and onto display screen so as to from an image. In the preferred embodiment of the invention, the SLM 15 is of a type known as a deformable mirror device (DMD) which will be discussed in detail below. Other SLMs (such as Bragg cells, LCDs, etc.) could be used in either a reflective (as shown) or transmissive mode provided that individual beams of light may be redirected at a high enough rate. The importance of the requirement of high switching speeds will become apparent below.

SLM 15 has a surface 16 upon which light from path 7 impinges. The surface 16 has a number of switchable elements (such as 17) that are controllable to redirect light toward the enlarger lens 5. For example, when element 17 is in one position, a portion of the light from path 7 is redirected along path 6 to lens 5 where it is enlarged or spread along path 4 to impinge the display screen 2 so as to form an illuminated pixel 3. When element 17 is in another position, light is not redirected toward display screen 2 and hence pixel 3 would be dark.

Computer 19 controls the operation of SLM 15 via bus 18 so as to form the image on display screen 2 by selectively redirecting portions of light on path 7 toward. The bus 18 provides the necessary control signals and image information from computer 19 to modulator 15. The computer 19 can be, for example, a digital signal processor (which is discussed in detail hereinafter).

In the preferred embodiment of the invention, surface 16 comprises an array of deformable mirror cells. Deformable mirror cells suitable for use in array 16 is shown in FIGS. 1b, 1c, and 1d. Four cells, 17, 27, 37, and 47 are shown in FIG. 1b. The mirror 32 of cell 17 is connected by hinge 30 to modulator 15 at about the location shown in FIG. 1b. When the cell 17, is actuated, the mirror 32 is pulled downward from its position shown in FIG. 1c to its position shown in FIG. 1d. When the cell 17 is in the down position it directs light along optical path 6. When the mirror is in the up position of FIG. 1c, the portion of the beam from optical path 7 is directed away from the optical path 6 and display 2. The other portions of the array 16 which are not hinged, for example, surface portion 34, also does not direct light toward display 2.

In the presently preferred embodiment, it is seen that light is directed toward the display screen 2 only when a mirror (such as 32) is in the down position. This is because other portions of the array 16 (such as surface portion 34) may also be reflective and would add visual noise to the display. In the preferred embodiment, light path 7 is substantially perpendicular to SLM 15 and light path 6 is at an angle. Other embodiments are of course possible without departing from the scope of the invention. For example, light path 7 could be at an angle to SLM 15 and light path 6 may be formed when a mirror element such as 32 is in the up (or normal with surface portion 34) position. A Schlieren stop would then be inserted prior to lens 5 so as to block unwanted light such as from surface portion 34.

Figure 2A:
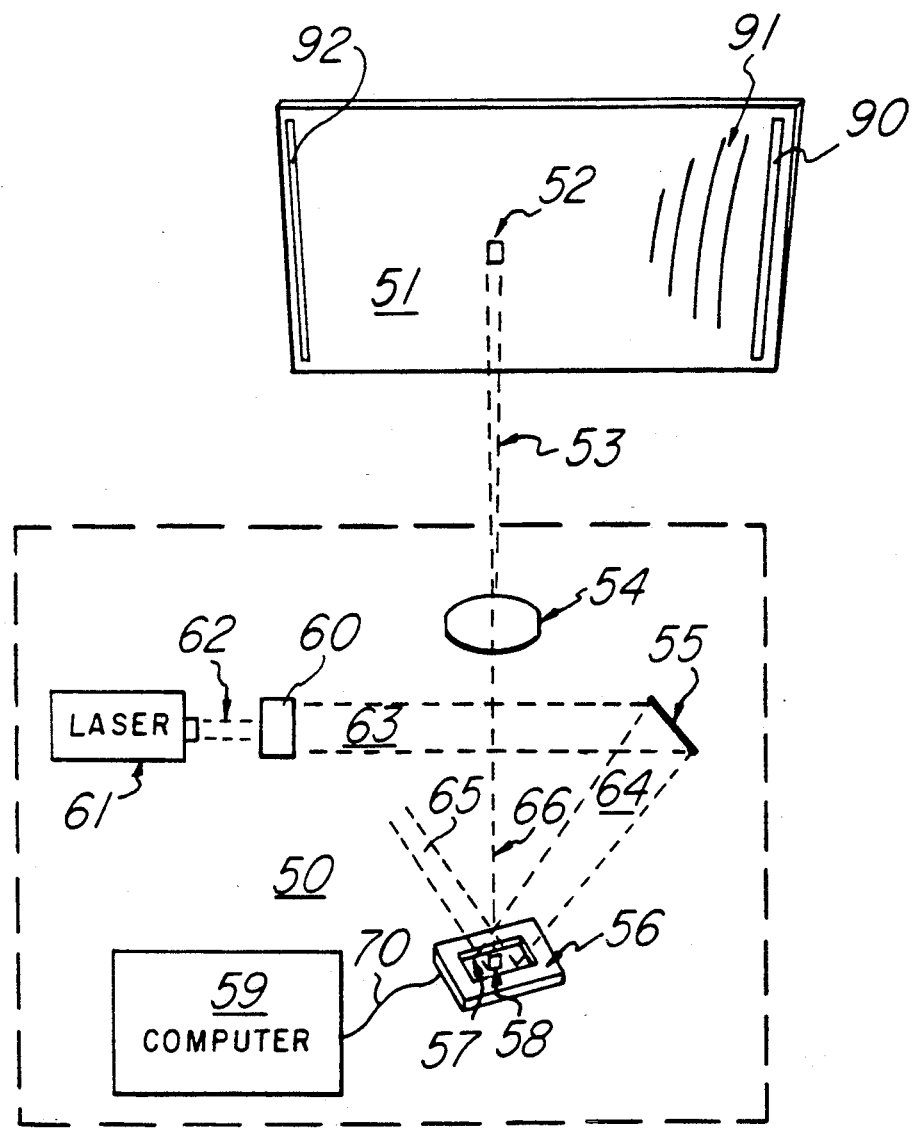
FIGS. 2a, 2b, and 2c shows a two dimensional digital video system utilizing a deformable mirror device and a laser.

FIG. 2a shows another preferred embodiment of a two dimensional digitized display system of the present invention. This comprises an image generating system 50 and a display 51. The display has a pixel 52, which is one pixel of many pixels which make up the image for display on display screen 51. The pixel 52 is located along optical path 53 from an image enlargement system 54 which can be of an suitable type such as a lens system, fiber optic array, etc.

A laser 61 generates a beam of light 62. A beam expander 60, which can be of any suitable type, serves to expand the small diameter beam of light 62 from laser 61 into a larger diameter beam 63. This beam is then deflected by fold mirror 55 onto SLM 56 along path 64. In this presently preferred embodiment, SLM 56 is of a different construction (as will become apparent below when discussing the FIGS. 2b and 2c) than that shown in FIGS. 1a, 1b, and 1c. Mirror elements such as 58 of array 57 are movable between two positions. In the "on" position, element 58 redirects a portion of the light from path 64 along path 66 to enlarging lens 54 where it is enlarged (spread) along path 53 to impinge on display screen 51 to form illuminated pixel 52. In the "off" position, the light is directed along path 65 where it will not impinge on the display screen 51.

Figure 1B:
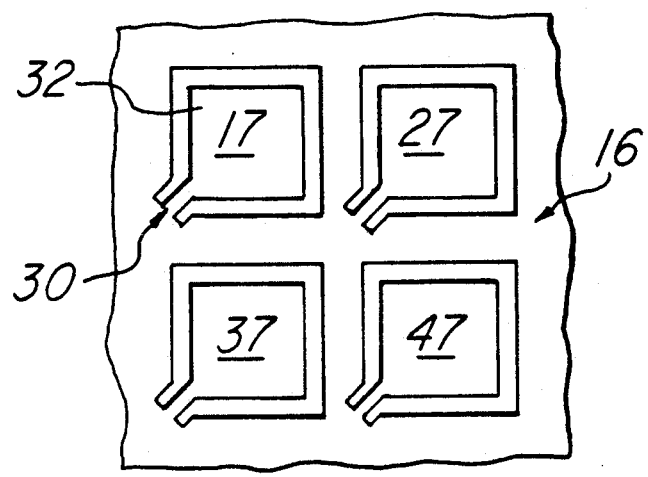
Figure 1C:
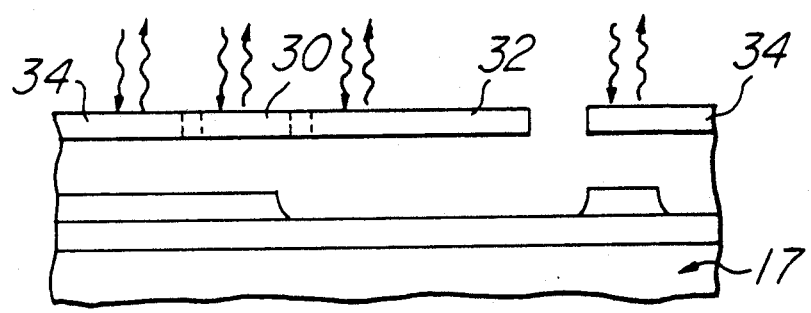
Figure 1D:
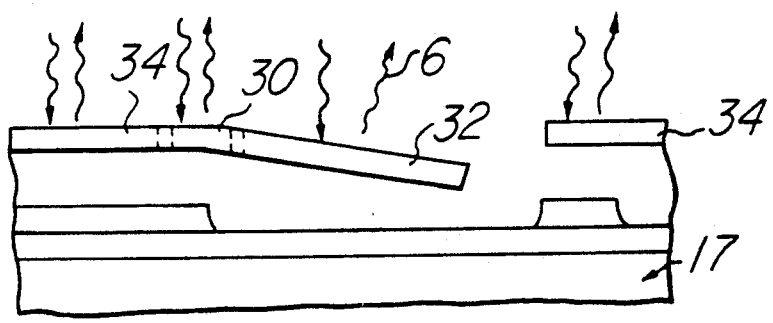

Display screen 51 may be of conventional structure as in the display screen 2 of FIG. 1a. However, as discussed in the BACKGROUND, laser speckle is likely to result unless the screen 51 is optically smooth. For practical reasons such as difficulty in manufacture this in unlikely. Further, in order to increase the viewing angle, some sort of dispersive surface (such as ground glass) should be used. This increases the amount of speckle unless the degree of dispersion will almost totally dephase the coherent light impinging. Unfortunately, this has the side effect of blurring the image and thus decreasing apparent resolution.

The present invention overcomes the speckle problem in several ways. Images generated on display screen 51 are composed of a plurality of light beams impinging on the surface simultaneously. A given light beam will have a slightly different angle when it impinges the screen relative to each of the others due to the effect of the enlarger lens system 54. Further, each light beam will have a slightly different length light path. This is additionally enhanced by the distance between each of the mirror elements of array 57. Because of the differences in relative angles and path lengths of the simultaneously impinging light beams, the relative phase of the beams is different when they impinge on the display screen 51. This has the effect of reducing the overall coherence of the light image and thus reducing the apparent speckle without degrading the resolution.

Display screen 51 also has a transducer 90 coupled to it. The transducer 90 sets up surface acoustic waves 91 that traverse the display screen 51 with substantially parallel waves. An optional wave absorber 92 absorbs waves that have traversed display screen 51 so as to prevent reflections. In other embodiments, transducer 90 may generate waves of arcs or circles. Transducer 90 may be of conventional structure and is preferably operative to generate signals in the ultrasonic range so as to be out of the range of human hearing. Amplitude of the surface acoustic waves 91 is greater than one wavelength of light. This serves not only to dephase the relative beams of light, but also to disperse a single beam. This is because the angle at which the beam impinges the display surface 51 (and hence the angle at which the beam is reflected or diffracted) varies due to the surface acoustic wave. The display screen 51 can be used in either a front projection or a back projection mode.

In another embodiment of the invention, display screen 51 may comprise, or be coated with, materials known in the art (such as uranyl ions, lanthanum ions, erbium ions, organic daylight fluorescent pigments, etc.) that exhibit optical fluorescence when excited by non-visible light. Laser 61 generates either UV or IR (depending on the materials selected) light. Preferably, display screen 51 is used in the back projection mode. The side of display screen 51 facing the viewer (opposite from the side facing the image generator 50) is additionally coated with a material that absorbs the light from the laser 61 so as to minimize any visual hazards. Optionally the coating may reflect the light. For the reasons discussed below, the fluorescing material has a decay time that is substantially less than phosphors used in conventional CRTs.

SLM 56 is coupled to computer 59 by a control bus 70. Computer 59 controls each mirror element (such as 58) of the array 57. These mirror elements are switched between the "on" and the "off" positions to form the image on display screen 51.

In an additional embodiment of the invention, computer 59 is also coupled to laser 61. Laser 61 is of the multi-mode or tunable type as is well-known in the art. Computer 59 controls the output light frequency of laser 61. By the techniques discussed below, a color display may be generated by time sequencing the frequencies generated by laser 61. Similarly, display screen 51 may have a plurality of materials, each fluorescing a different color depending on the frequency of the impinging light beams.

Figure 2C:
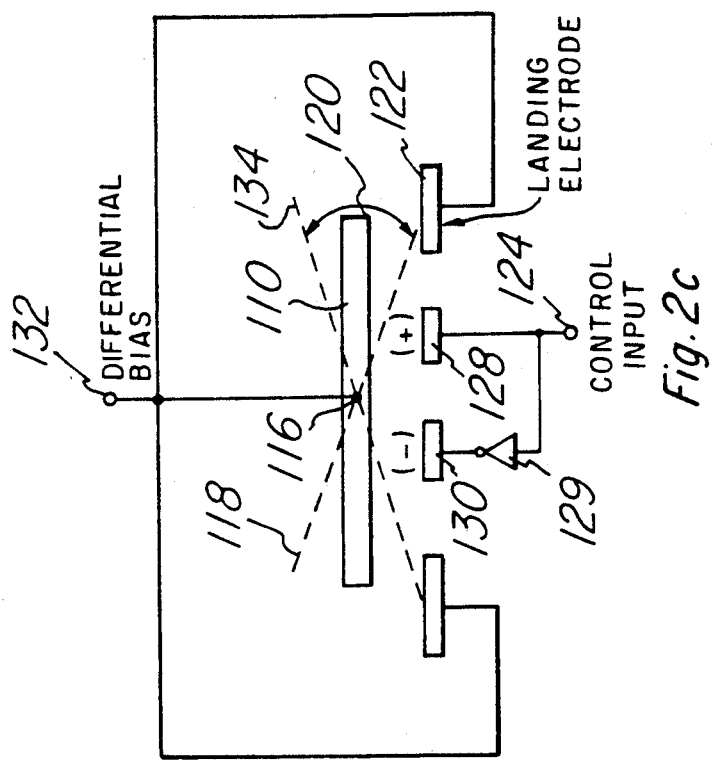
Figure 2B:
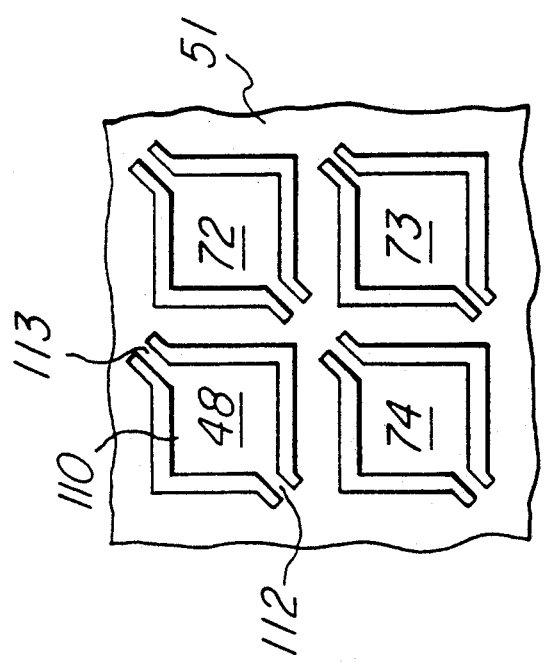

A portion of array 57 is shown in FIG. 2b with deformable mirror cells 48, 72, 73, and 74. Only cell 48 is discussed in detail. The mirror 110 of cell 48 is movable about torsion hinges 112 and 113. The movement of mirror 110 is best shown in FIG. 2c. Mirror 110 is movable about an axis 116 from the position shown by dotted line 118 to the position shown by dotted line 134 relative to the normal surface 120.

In the "on" position, the edge 120 of mirror 116 touches landing electrode 122. The mirror 110 is moved to the "on" position by applying the proper voltage to control electrode 124. The voltage on electrode is applied to positive electrode 128 and through inverter 129 to negative electrode 130. A differential bias is applied to the mirror 130 through an electrode 132. In the position shown by line 118, the mirror 130 directs a portion of light beam from optical path 64 along optical path 66 through system 54 along optical path 53 to pixel 52 on display 51. If a negative voltage (the "off" position) is applied to electrode 124, then the mirror 110 will rotate to the position represented by the dotted line 134 in FIG. 2c and directs a portion of light beam along optical path 65.

Figure 3:
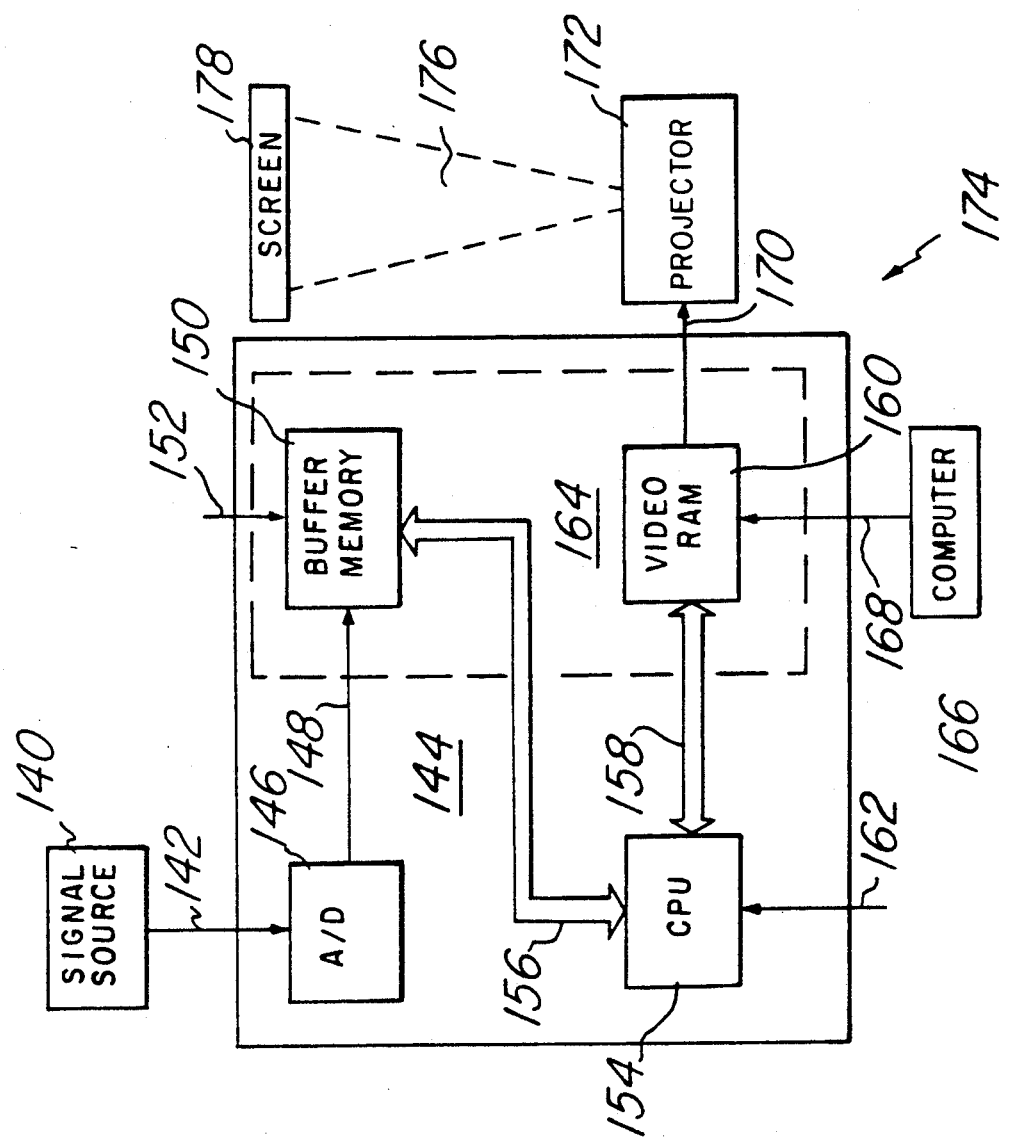
FIG. 3 is a block diagram of the electronics for a digitized video system.

In FIG. 3, a signal source 140, which can be for example a TV tuner such as those incorporated above, is connected through a bus 142 to an electronics system 144. The bus 142 is connected to an analog to digital (A/D) converter 146. The analog signal received by A/D converter 146 from bus 142 is converted by A/D converter 146 to digital codes on bus 148. These digital codes are representative of the chrominance and luminance information of each pixel of an image. Bus 148 connects the digital codes from converter 146 to a buffer memory 150. The digital codes from converter 146 are stored into buffer memory 150. In a different mode, digital codes or information can be loaded into buffer memory 150 through bus 152, for example, from a computer or graphics system. Indeed, in some embodiments of the invention, all information may come through bus 152 and signal source 140, bus 142, converter 146 and 148 would not be needed.

Buffer memory 150 can be a single ported random access memory (RAM). In this case, bus arbitration between buses 148, 156 and 152 can be handled in a conventional manner by DMA (direct memory access) controllers as is well known in the art. First priority is given to bus 148 (as there is no practical way of stopping data from coming in from the signal source 140). Second priority is given to bus 156 as it must obtain display data very rapidly. Alternatively, the buffer memory 150 can be of the dual or triple ported type for increased throughput. Design of multi-ported memory is also well-known in the art.

The digital codes or information, together represent an image that is to be displayed. The digital codes within buffer memory 150 are transferred to a central processing unit (CPU) 154 through bus 156. The CPU can be a standard microprocessor such as a TMS 99000 (manufactured by Texas Instruments) or more desirably a digital signal processor (DSP), for example, TMS 320C10, TMS 320C20, TMS 320C25, and TMS 320C30. Details of the use and structure of these DSPs are given in Digital Signal Processing-Products and Applications "Primer" (1988), TMS 320C1x User's Guide (1987), TMS 320C10 User's Guide (1983), TMS 320C2x User's Guide (1987), TMS 32020 User's Guide (1986), TMS 320C25 User's Guide "Preliminary" (1986), and TMS 320C30 User's Guide (1988), all of which are incorporated by reference hereinto.

The CPU 154 is connected through bus 158 to a video memory 160, which is preferably made up of video DRAMs (VRAMs) such as the TMS4461 from Texas Instruments, Inc. of Dallas, Tex. Preferably, a plurality of VRAMs is used, with the high-speed serial outputs of each VRAM corresponding to a few of the columns of the generated display on display screen 178. This is done so as to increase the load bandwidth of the planar projector 172. The reason it is necessary to have a large load bandwidth will become apparent in the discussions below.

The CPU 154 decodes the video information, including chrominance and luminance, within the information from memory 150. The CPU 154 is programmed to extract image from that information and store that image including chrominance and luminance into video memory 160. The image can also be modified by CPU 154 under instructions through bus 162 or under the control of its program. The buffer memory 150 and video memory 160 comprise a memory 164 and could be constructed as a single memory. Further, the video memory 160 could be directly loaded from a graphics system or computer 166 through bus 168.

The electronic system 144 and the projection system 172 comprise an image generating system 174 which can use the image generating system 1 in FIG. 1a with the spatial modulator 15 connected to video memory 160 through bus 18. In the same manner, memory 160 can be connected to modulator 56 in FIG. 2a through bus 70. In other words, the image generating system shown in FIG. 3 has more detail for the electronics and FIGS. 1a and 2a have more detail as for the optics and all of the various embodiments disclosed herein can be combined using the teachings herein to construct various digitized display systems. The image stored within memory 160 is transferred through bus 170 to the projection system 172 for display through an optical path 176 to display 178 such in the systems shown in FIGS. 1a-1d and 2a-2c.

From the above descriptions, it can be seen that projector system 172 is a planar projector. In other words, all pixels that are to be displayed on display screen 178 are illuminated simultaneously rather than being displayed sequentially by a raster. Further, data feeding projector 178 comes from memory 160 while incoming data is buffered in buffer memory 150. Thus the data rate to projector 172 is totally independent of the incoming rate from the signal source 140. This allows the present invention to be raster rate independent.

In the United States, the television broadcast standard is NTSC. This requires an interlaced refresh rate of 60 hertz. In other countries, refresh rates may be 50 hertz. The raster rate is of course directly tied to the refresh rate. In particular, Europe uses PAL and CCAM as the standards which have 50 hertz rates. As the present invention is raster rate and refresh independent, it can be freely used in any country. The CPU 154 merely has to detect the frequency of the sync signal (or use the color burst or other known techniques) to determine how to store the data to memory 160. In an alternate embodiment, a switch is provided to allow the user to select the standard used. In still another embodiment, signal source 140 would provide CPU 154 with a signal associated with the broadcast frequency tuned to in order to inform CPU 154 of the broadcast standard used.

In the presently preferred embodiment of the invention, the SLM used in the projector system 172 comprises an array of 1280 by 800 cells. Thus the display image on display screen 178 has a resolution 1280 by 800 pixels (each pixel corresponding to one cell). Of course any size may be chosen depending on the application.

The NTSC broadcast standard has an image resolution of approximately 320 by 200 pixels. A simple way of displaying NTSC data on the display of the present invention would be to control a sub-array of 16 cells (i.e. a 4 by 4 sub-array matrix) for each of the pixels. However this would tend to make a magnified projected image appear very coarse. In the presently preferred embodiment, the NTSC data loaded into buffer memory 150 is processed by CPU 154 before being loaded into memory 160. This processing uses the well-known nearest-neighbor algorithm to interpolate intermediate display pixels in both the horizontal and vertical directions, since at least one entire frame of data (or at least several lines of data) may be stored in buffer memory 150. Thus for each pixel of NTSC data, 15 additional pixels are computed by CPU 154. Additional and/or alternate processing, including other algorithms than the nearest-neighbor algorithm presently preferred, may be used. This serves to smooth the image and to increase apparent resolution.

Likewise, if the incoming data has an image resolution greater than can be displayed by projector 172 (i.e. greater than the number of cells of the SLM), CPU 162 applies processing routines to the data in buffer memory 150 before storing the results in memory 160. This processing is again based on looking at a matrix subset (i.e. neighboring horizontal and vertical pixels) of the image data in buffer memory 150. A computed pixel is then output to memory 160 for display by projector 172 onto display screen 178. Since every pixel to be displayed is computed, there is no need for the incoming data resolution size to be any whole multiple of the display resolution. Thus the present invention is totally standard independent, in both data rate and resolution.

Figure 4:
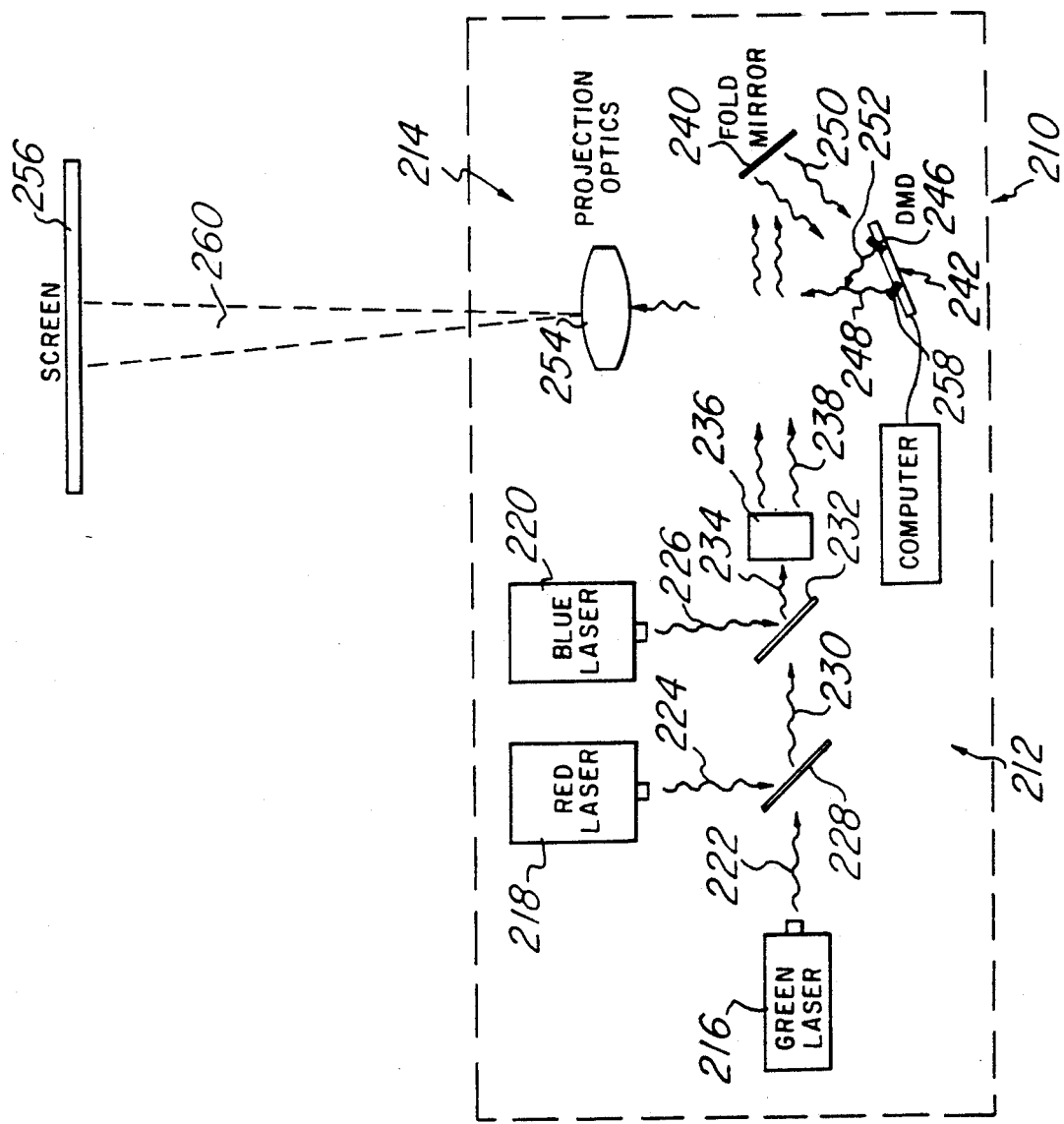
FIG. 4 shows a two dimensional digitized video system capable of producing a color image.

FIG. 4 illustrates another embodiment of the invention. In FIG. 4, the image generating system 210 has an electronics system 212 and projection 214. This a color system with a green laser 216, red laser 218, and blue laser 220. The green laser 216 produces a beam of green light along optical path 222. The red laser 218 produces a beam of red light along optical path 224. The blue laser 220 produces a beam of blue light along optical 226. A combining mirror 228 passes the green light from optical path 222 through to optical path 230 and redirects the red light from optical path 224 to optical path 230. Another combining mirror 232 is located along optical path 230 to pass the green and red light from optical path 230 through to optical path 234 and redirect the blue light from optical path 226 to optical path 234.

A beam expander 236 expands the light from optical path 234 into a beam of larger diameter along optical path 238. The light from optical path 238 is reflected from mirror 240 onto a spatial light modulator 242, which can be a deformable mirror device, such as the device shown in FIGS. 2b and 2c. The mirror 240 redirects the light from path 238 to optical path 250. The light from path 250 impinges onto spatial light modulator 242. If the control signals from memory within the electronics system 212 (only computer system 243 and bus 244 is shown), have applied a positive voltage to deformable cell 246 it will rotate to the left (as shown by cell 246 in FIG. 4) or to the right if a negative voltage is applied. If the control signals from memory within the electronics system 212, (only computer system 243 and bus 244 is shown) have applied a negative voltage to deformable cell 248, it will to rotate to the right (as shown by cell 248 in FIG. 4) or will rotate to the left if a positive voltage is applied. This is also discussed in somewhat more detail in FIGS. 8 and 9 herebelow.

As shown in FIG. 4, the portion of the light from optical path 250 associated with cell 246 is redirected along optical path 252. Optical path 252 does not intersect projection system 254 or display (or screen) 256. The portion of the light from path 250 associated with cell 248 is redirected along optical path 258. Optical path 258 intersects projection optics 254. The light beam redirected from cell 248 along optical path 248 is expanded and directed onto display 256 by projection optics 254 along with all of the other cells (not shown) on spatial light modulator 242 which are rotated to direct light toward projection optics 254. This forms an image on display 256, which is located along optical path 260 from projection optics 254. The lasers 216, 218, and 220 are actuated in sequence by the electronics system 212. The computer 243 loads the appropriate information for each color. For example, when the green laser 216 is to be actuated, the information of the green portion of the image is loaded into modulator 242. This is discussed in detail below. The projection optics 254 could, for example be a lens system or a fiber optics array.

The critical flicker frequency (CFF) of the human eye is of concern in the present invention. The CFF is the frequency at which the eye is no longer able to perceive a flickering (i.e. rapidly changing from dark to light) image as distinct flashes, but rather as a continuous source of light. This frequency changes as the intensity of the source changes. For example, at low luminosity (retinal illumination of-1.6 photons) the CFF is approximately 5 hertz. At higher levels of luminance (retinal illumination of 5 photons) the CFF is greater than 60 hertz. The eye has an integration time of 100 to 200 milliseconds (depending on intensity) before it can accurately perceive the relative intensity of a light source. Because of this, luminosity can be varied for each pixel displayed by the system of the present invention by rapidly modulating a constant source of light.

Similarly, the eye also has an integration time for color. This means that by sequencing a plurality of colors; the eye will merge them into a single color. For example, if the color primaries red, green and blue are rapidly sequenced, the eye will see a white source. By varying the intensity of each primary (including by the time modulation discussed above), any color can be selected.

Figure 8:
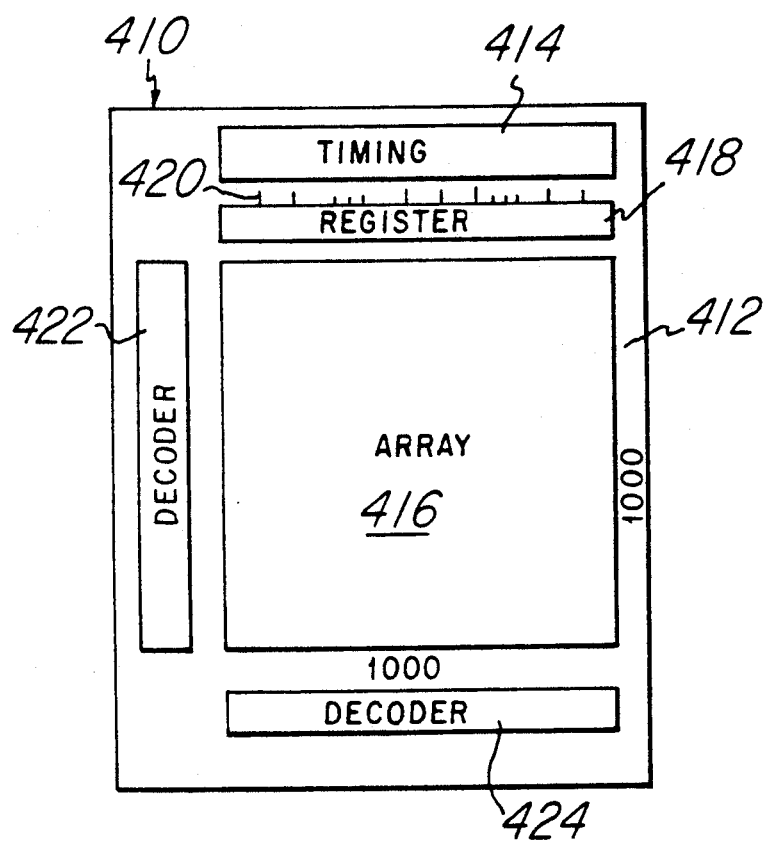
FIG. 8 is a top view of a spatial light modulator.
Figure 9:
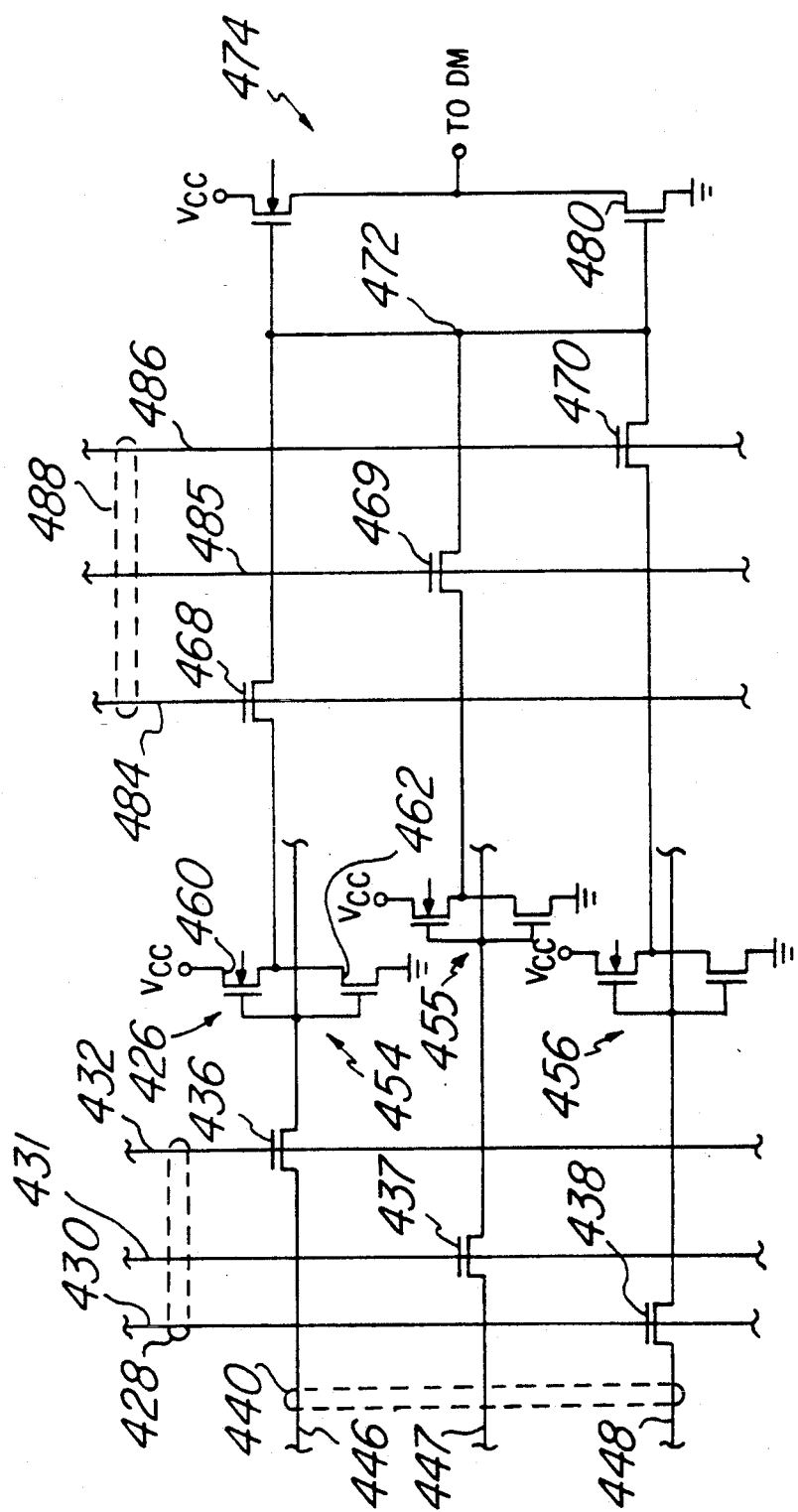
FIG. 9 is a circuit diagram of a memory cell of a deformable mirror array.

The SLM of the present invention is capable of being modulated at a very high rate. For example the mirror cells have a switching time between off and on of about 10 microseconds. Likewise the array is able to accept control data at a very high rate. How this is achieved is shown in FIGS. 8 and 9. In the presently preferred embodiment of the invention, the entire mirror cell array of the SLM is able to be loaded and each cell switched during a time period of 20 microseconds.

As a consequence of this high switching ability, the SLM of the present invention can modulate each pixel at a data rate 833 times faster than the CFF for a bright image. At lower levels of desired luminance, the differential rate is of course much higher. The present invention is able to achieve wide dynamic range of both chrominance and luminance due to this speed.

Figure 5A:
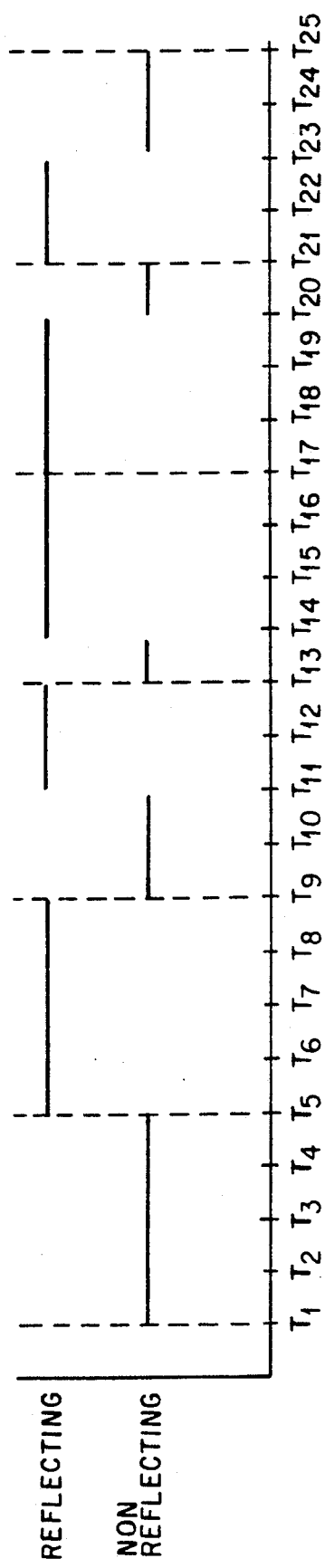
FIGS. 5a, 5b, and 5c show graphs and a color wheel.

An example of how different luminance levels are achieved is shown in FIG. 5a. For simplicities sake, each time period (T1, T2, ... T25) is assumed to be 4 milliseconds although as stated, the SLM of the present invention operates much faster. This is done merely to illustrate that various luminance levels can be achieved even at these slow rates and still be faster than the critical flicker frequency. Every large increment of time (corresponding to 4 time slices of 4 milliseconds each) represents the same pixel location on the screen and the intensity desired as received from the signal source. The horizontal lines represent the signal provided to the SLM. For example when the horizontal line is in the down position, the SLM does not direct light toward the display screen and when the horizontal line is in the higher position, the light is directed toward the display screen.

The first large increment (encompassing time slices T2 through T5) shows the SLM as not directing any light toward the screen. Thus the displayed location of the pixel would not be illuminated. During the second large increment (encompassing T6 through T9), the pixel is fully illuminated and would be at its most visibly bright state. The next increment (represented by T10 through T13) illustrates half intensity. In other words, during half of the total time, light is not directed toward the screen and half the time it is.

The next two large increments (represented by T14 through T17 and T18 through T21) have equal intensity. This means that perceived intensity of the light is brighter than in the previous increments, but less than the second. However, the eye may perceive the increment spanning T18 through T21 as marginally brighter than that of T14 through T17. This is because the eye has an intensity integration time. Because there is an extended period (T15 through T20) in which the light is on, the eye will start to integrate this as a high level of brightness and consequently may perceive the period T18 through T21 as brighter. Variations in the pattern can thus be used to further increase the apparent dynamic range of luminosity.

Figure 5B:
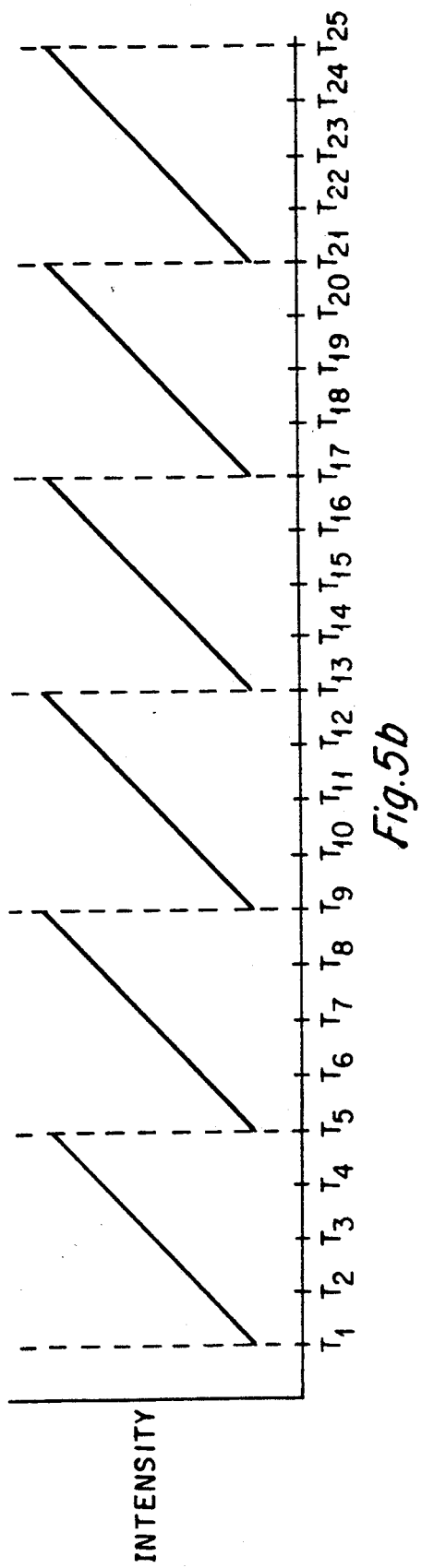

FIG. 5b illustrates how this dynamic range can be further stretched. During each of the larger time increments (T2 through T5, T6 through T9, etc.) the light source itself is modulated in intensity. While the pattern shown is of a sawtooth type, any pattern can be used such as logarithmic, exponential, etc. Looking at FIGS. 5a and 5b together it can be seen that the perceived brightness of increment T10 through T13 would be greater than T22 through T25, even though both increments have two on and two off.

Modulation of the light source can be achieved in a variety of ways. For example, in the laser based projection system of FIG. 2a, the laser can be controlled either by computer 59 or other circuitry to rapidly change its intensity of generated light. For conventional light source generator systems as shown in FIG. 1a, a variably grated wheel such as that shown in FIG. 5c could be spun in the light path prior to the SLM 15. Preferably this spinning wheel would be placed between light source 10 and lens 12 to help maintain the columnated beam.

Figure 5C:
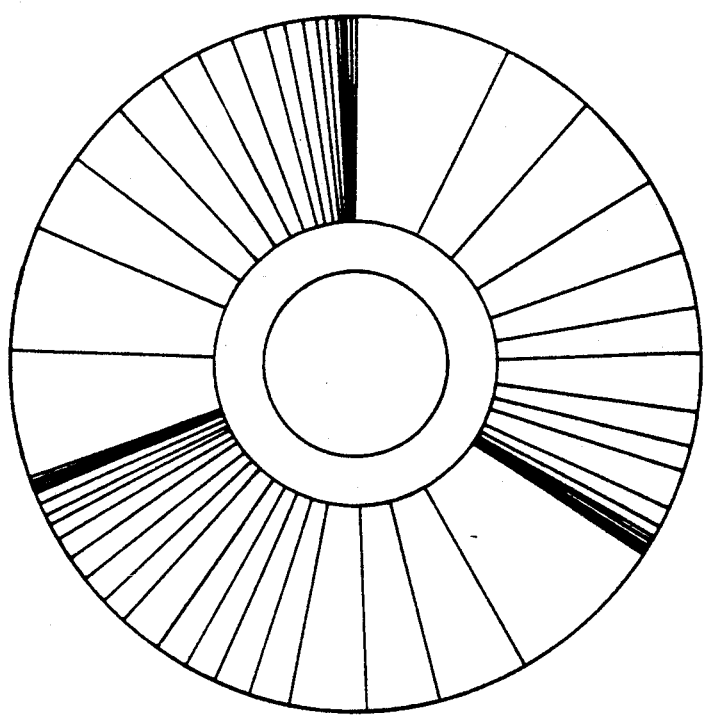

Color can be added by sequencing different color primaries (for example red, green and blue) during a time interval less than the CFF time. The eye will temporally integrate distinct colors into a single color if they are sequenced fast enoguht. The system of FIG. 1a may have color added by spinning a wheel such as shown in FIG. 5c within the light path leading to SLM 15. Used in this manner, the wheel of FIG. 5c has each major section acting as a different color filter. For example one section would filter all but red, the next all but blue, and the third all but green. Thus a single wheel would allow both luminosity control and color control. The wheel shown in FIG. 5c is by way of illustration only as the wheel could be divided into more color sections, or be comprised of wedges, or other configurations as may be appropriate. Other embodiments may use other filter systems such as acousto-optic spectral filters.

Color can be added to the system of FIG. 2a by using a multimode or tunable laser 61. Each color would be selected by tuning the laser 61 to a different frequency at a relatively rapid rate. The system shown in FIG. 4 of course has three color lasers (216, 218 and 220). These would be sequenced. Alternatively, all pixels of a given color (derived from various combinations of the three lasers 216, 218 and 220 generating light simultaneously by at different intensities) could be displayed at once. The next set of pixels of a different color or intensity would be displayed, and so on. Of course, pixels of different luminositites but of the same color could be handled by the technique of modulating the SLM within time slices as discussed above.

Different sequences than those discussed above are possible. For example, blue light sources (such as laser 220 of FIG. 4) tend to be more expensive for the same light output than red or green. It would then be better to follow a pattern such as red, blue, green, blue, red, etc.

Another embodiment of the invention that adds color is to optically combine three projectors such as those shown in FIGS. 1a and 2a so that a single image is obtained. Each of the projectors would be responsible for only one of the color primaries.

Figure 6:
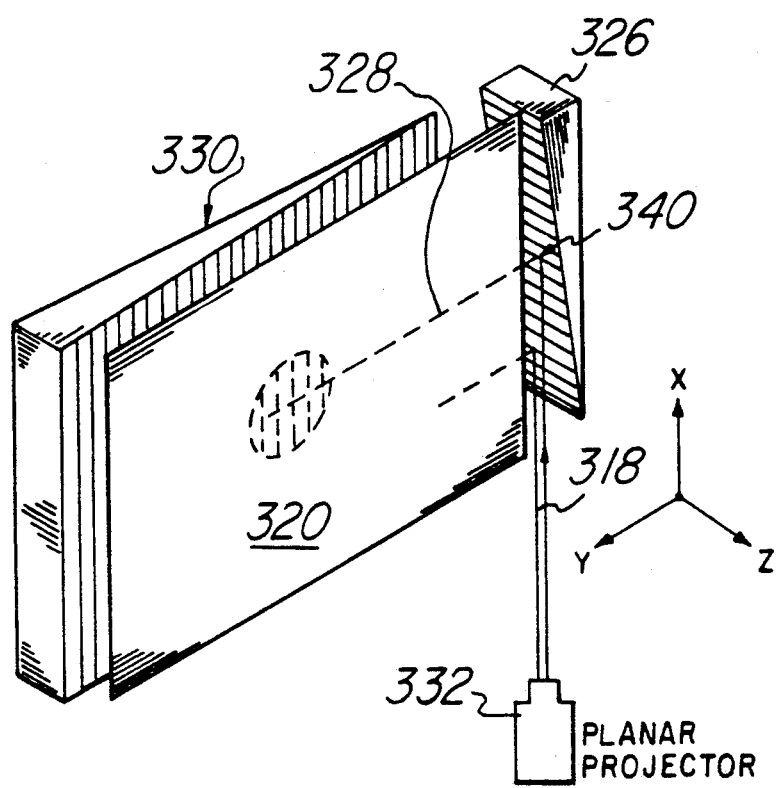
FIG. 6 shows a two dimensional display.
Figure 7:
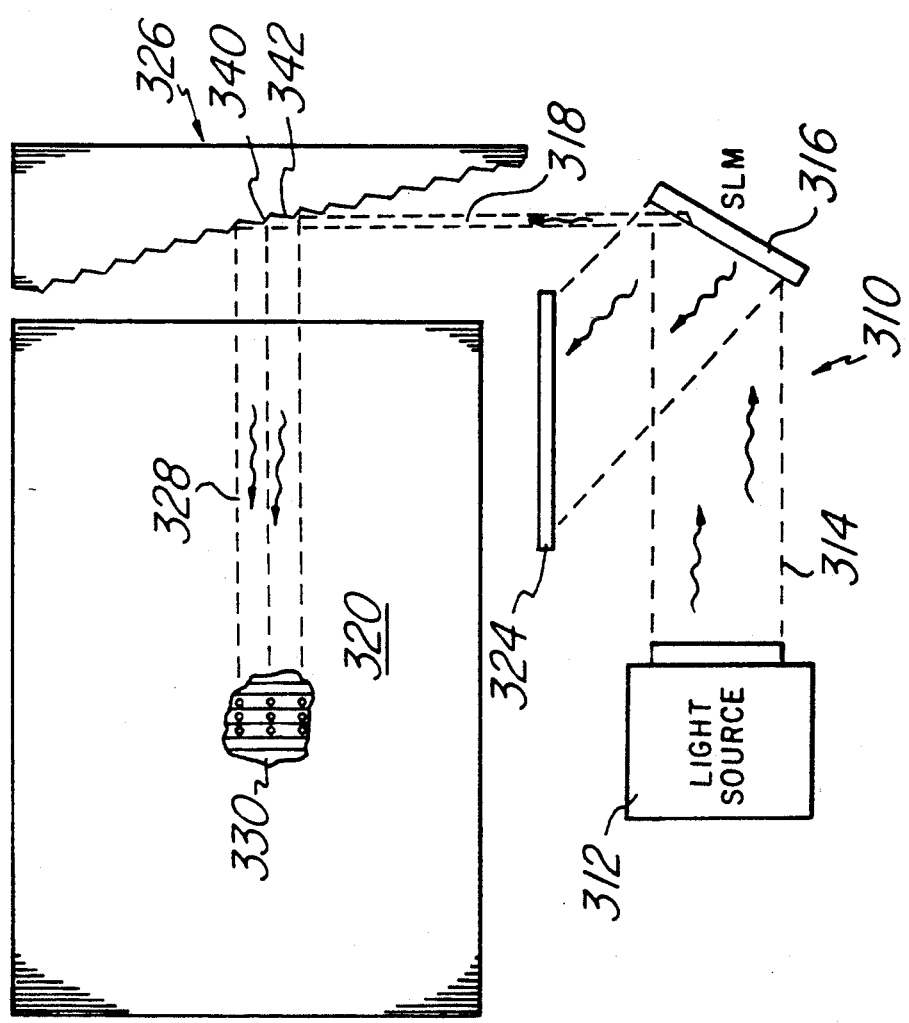
FIG. 7 shows another view of the display of FIG. 6.

FIGS. 6 and 7 are another example of a useful projection optics 310. A light source 312 produces a beam of substantially parallel light along optical path 314. Spatial light modulator 316 is located along optical path 314. As with the other spatial light modulators, some of the light is directed along an optical path 318 toward display 320 to form an image and the remainder of the light is not. In FIG. 7 this remainder of the light is directed along optical path 322 and intercepted by plate 324 and does not reach the display 320. A serrated lens 326, which can be a single piece of molded plastic, is located along optical path 318. The light is reflected in parallel along optical path 328 as received but the image is enlarged in the vertical direction as shown in FIG. 7.

Note differences in width between the dotted lines of optical path 318 and 328. The light reflected along optical path 328 is directed onto a serrated lens 330. The light reflected from lens 330 and onto display 320 is still parallel but is enlarged in the horizontal direction as shown in FIG. 7. The lens 330 is located behind display 320 and only a portion is shown in FIG. 7 and is shown better FIG. 6. In FIG. 6, the projection system 310 of FIG. 7 has been replaced by planar projector 332. Lens 326 enlarges the light from optical path 318 in the X direction and lens 330 enlarges the light from optical path 328 in the Y direction. The light is reflected from lens 330 in the Z direction to the display 320. The lenses 326 and 330 are serrated or stair stepped, which can be best seen in FIG. 6 from the side view of lens 326. Each step has a reflecting surface, for example, surface 340 and a non-reflecting surface 342, for example. The reflecting surfaces may be straight (as shown) or optionally may be curved. A curved reflecting surface will spread or enlarge an impinging beam of light. If the curved embodiment is employed, then it may be unnecessary to break a beam into a plurality of smaller beams as the desired enlargement will still occur. The lenses 326 and 330 are therefore, narrow at one end (the bottom for lens 326, the right for lens 330, as shown in FIG. 7) and thicker at the other end (the top for lens 326, the left for lens 330, as shown in FIG. 7).

If highly columnated light is used in the display system of FIGS. 6 and 7, the enlargement actually results in a plurality of spaced, smaller beams of light impinging the display surface. In the preferred embodiment, the display surface is a highly dispersive surface (such as ground glass) that will serve to blur the beams together so as to form a larger pixel. In an alternate embodiment, the display surface may be coated, as discussed above, with pigments that will fluoresce when excited by the impinging light.

As shown in FIG. 8, a spatial light modulator 410, which is a deformable mirror device 412, is constructed on a single substrate. The details of construction of deformable mirror devices is set forth in the Patents and incorporated above. The timing for the device 412 can be located in one or more locations, for example, timing circuit 414. A square array 416 of deformable mirror cells is shown. The cells can be those shown in FIGS. 2b and 2c, arranged in row and columns. The array as shown is 1280 by 840 cells, but it can be of any convenient shape, for example, rectangular or circular and be of any convenient size such as 320 by 200 cells. A register 418 is located between the timing circuit 414 and the array 416 along the top (as shown in FIG. 8) of array 416. The register 418 can be a shift register and can be made up of several different registers. The register has a number of taps 420, for example, 10 or 100 as necessary to insure that the register can be loaded at the required speed. The taps are connected to a bus (such as the bus 170 in FIG. 3). The timing circuit can provide most of the required address signals for loading the information into array 416 or that can be provided through the bus.

A decoder 422 is located along another side of the array (the left side as shown in FIG. 8). The decoder 422 provides the necessary control signals to select the appropriate row within array 416, in response to an address for the information in register 418 to be loaded. The decoder 424 is located along another edge of array 416 at the bottom as shown in FIG. 8. The decoder 424 provides the necessary control signals to select one of several memory cells associated with all or at least most of the deformable mirror cells in array 416. A counter or commutator within either timing circuit 414 or decoder 424 provides the address of the proper memory cell to select. For example, a pixel code loaded into memory cell 1 of 3 associated with each deformable mirror cell can be displayed by selected memory cell 1 of all or at least most of the deformable mirror cells, for example, memory cell 426 of FIG. 9. It should be noted that decoder 422 must not only determine which row of deformable mirror cells to select, but also which of the memory cell associated with those deformable memory cells to select.

As shown in FIG. 9, the group of row selection lines 428, which consists of lines 430, 431, and 432, from decoder 422 are connected to the gates of NMOS access transistors 436, 437, and 438, respectively. The group of data lines 440, which consists of lines 446, 447, and 448, from register 418 are connected to one side of the source to drain paths of transistors 436, 437, and 438, respectively. The other side of the source to drain paths of transistors 436, 437, and 438 are connected to the inputs of CMOS inverters 454, 455, and 456, respectively. The inverters and access transistors could be replaced by standard DRAM cells, or SRAM cells. Only inverter 454 will be discussed in detail. Inverter 454 has a PMOS transistor 460 and an NMOS transistor 462. The gates of transistors 460 and 462 are connected to the input of inverter 454. One end of the source to drain paths of transistors 460 and 462 is connected to the output of inverter 454. The other end of the source to drain path of transistor 460 is connected to the supply voltage (Vcc) and the other end of the source to drain path of transistor 462 is connected to ground.

The outputs of inverters 454, 455, and 456 are connected to one end of the source to drain paths of transistors 468, 469, and 470, respectively. The other sides of the source to drain paths of transistors 468, 469, and 470 are connected to node 472. Node 472 is connected to the input of inverter 474. The inverter 474 has a PMOS transistor 478 and an NMOS transistor 480. The gates of transistors 478 and 480 are connected to the input of inverter 474 and node 472. One side of the source to drain path of transistors 478 and 480 are connected to the output of inverter 474, which is the input to the deformable mirror cell such as the control electrode 124 (FIG. 3). The gates of transistors 468, 469, and 470 are connected to memory cell selection lines 484, 485, and 486, respectively, which are 3 of the selection lines 488 from decoder 424. Decoder 424 could be viewed as providing the read function of the memory cells and decoder 422 as providing the write function. It is useful to have at least 2 memory cells per deformable memory cell, and while 3 memory cells are shown in FIG. 9, any number can be used as necessary.

In operation, line 446 is brought high and transistor 436 turns on allow a high ('1') or low level ('0') to be stored on the input of the inverter 454 as applied from line 446. The selection line 446 goes low and transistor 436 turns off storing the applied voltage on the gates of transistors 460 and 462. If the signal is high, then transistor 462 is on, applying ground to the output of inverter 454 and turning transistor 460 off. If the signal is low, then transistor 460 is on, applying the supply voltage to the output of inverter 454 and turning transistor 462 off. Thereafter, when it is desired to display the pixel of information stored in inverter 454, the selection line 484 is brought high and the inverse of the '0' or '1' stored.

Inverter 474 will invert its input and the '1' or '0' is applied to the deformable mirror cell form the output of inverter 474.

While the information on inverter 454 is being displayed, one or both of the inverters 455 and 456 can be loaded with information. Further, inverter 454 can be loaded while the information on either inverters 455 and 456 is being displayed. It should be noted that lines 446, 447, and 448 can be made as one line connected to transistors 436, 437, and 438. It should be noted that the circuits of FIG. 9 could be implemented in NMOS, PMOS, CMOS, GaAs, Bipolar, CCD or any other convenient technology. Thus, one preferred embodiment of a display cell 490 is shown in FIG. 9 with its inverters, access transistors, and selection transistors.

FIG. 10 shows a flow diagram for the operation of the CPU 154 of FIG. 3. The logic flow begins at step 510 and proceeds through line 512 to enter logic step 514. In step 514, the information in memory 150 is examined to determine which broadcast standard is being received, for example, HDTV, NTSC, PAL etc. or which computer display information is being received through bus 152, for example, from a color graphics adapter, an enhanced color graphics adapter, or a video graphics array. This can be done by locating the synchronization pulses, vertical and horizontal, as well as the chromatic and intensity components of the information. The logic then proceeds through line 518 and enters logic state 520. Within logic state 520, a test is made to determine if the standard has been determined. If the standard has not been determined, then the logic proceeds through line 522 and reenters step 514. If the standard has been determined, then the logic exits state 520 and proceeds through line 524 to logic step 526. In step 526, the logic locates the information within memory 150 for an image and preferably the start of an image.

Once the standard is known then the data can, for example, be examined for the vertical synchronization pulse. The logic then exits the step 526 through line 528 and enters logic state 530. If an image is present, then the logic exits state 530 through line 532 and enters step 534. In step 534 the image is stored in the proper format into memory 160. The logic the proceeds from step 534 through line 538 and reenters step 526. If an image not present, then the logic exits state 530 and reenters step 526 through line 540. Under certain conditions such as a change of channels the logic exits state 530 through line 542 and enters step 544. Step 544 could lead the logic to reenter step 510 or some other operation such as displaying the number of the new channel could be performed.

Further, a switch could be provided to allow the user to set the standard manually. Also, the standards for many channels could be stored in EPROM which is read by the CPU 154 using the channel information supplied by the signal source 140. Therefore, the switch or EPROM would be examined in step 514 and the standard determined in state 520.

As shown in FIG. 11, a true three dimensional digitized video system 610 is shown. System 610 has a display 612, which includes at least one multi-frequency sensitive material, and two spatial modulators 616 and 617. One or more beams of energy are supplied along each of optical paths 620 and 621 to impinge on modulators 616 and 617, respectively. These beams are preferable substantially parallel and beam expanders (not shown) expand the beams to intersect the lens systems along optical paths 624 and 625 to intersect lens systems 628 and 629, respectively. Lens systems 628 and 629 redirect the beams into substantially parallel beams into display 612. A hand held pointer 635 is shown for providing the user with the ability to interact with the computer driving the display, for example, enlarging a selected area, placing or moving an object within the display 612, providing a selected point for rotating the image within the display about, or any of the tasks associated with computer aided design systems.

The modulators 616 and 617 can be any of the several described herein. However, modulator 617 can be of a different type since it is providing an output beam along a horizontal (as shown in FIG. 11) line, for example, line 638. The modulator could also be a scanning horizontal beam. The modulator 617 is controlled either internally or externally to provide the lines in a known sequence synchronized with the information loaded onto modulator 616. The known sequence could be all odds and then all evens or all evens and then all odds, or from the top to the bottom or from the bottom to the top. Thus, the line of energy provided by modulator 617 defines a plane within the display 612, for example, plane 640. The voxels to be displayed are those for which an associated cell on modulator 616 directs an individual portion of the impinging energy beam along optical path 624. Thus, one plane of the image 650 is displayed at a time.

If the display 612 is monochrome then perhaps only two beams of energy of different frequencies need be provided along optical paths 620 and 621. If color is to be provided then several beams of different frequencies should be provided in a sequence. For example, beams along optical paths 620 and 621 could cause a multi-frequency sensitive material within display 612 to luminesce red in the plane where both beams are present. Then beams with one or more different frequencies could cause a multi-frequency sensitive material to luminesce blue and other beams could cause a multi-frequency sensitive material to luminesce green. Then, the next plane in the sequence would be provided with red, green, and blue information. Of course, all of the planes of display 612 could be provided with red followed by green and blue information, if desired. If intensity information is provided then there may be several different intervals for displaying red-green-blue information for each of the planes, as necessary. Additional memory cells could be provided on in addition to cell 426 to store the additional intensity information. Thus, the image 650 is generated a plane at a time in order to display a full 3 dimensional image. The system 610 of FIG. 11 can be modified to provide all of the color information simultaneously. Three spatial modulators could be provided with the red, green, and blue, respectively, information. An appropriate optical system would be provided to direct all three beams along optical path 624. The appropriate additional energy beams would also have to be provided along optical path 625. Thus an entire plane with all color information could be displayed simultaneously.

Although two dimensional television signals could be displayed in display 612, the digitized video system of FIG. 11 could be further modified in at least two ways to provide a two dimensional display. First the display could be thinned in the horizontal direction to form a thin sheet against lens system 629. Modulator 616 would be similarly thinned with one or more rows of cells remaining. If several rows are provided, some or all of the rows could provide redundancy if some of the cells in one row fail. Also, if several rows are used the intensity could be varied according to the number of cells in that column which are displayed. For example, if four bits of intensity information were provided then if the maximum intensity was desired the four cells on that column could all be on and all four voxels would be displayed at the proper time. Modulator 617 would operate as discussed above. Second, the display could be thinned in the vertical direction to form only a thin area next to lens 628. The modulator 617 could be replaced by an energy source providing a plane of energy through the display. The entire two dimensional image is displayed simultaneously.

Figure 16:
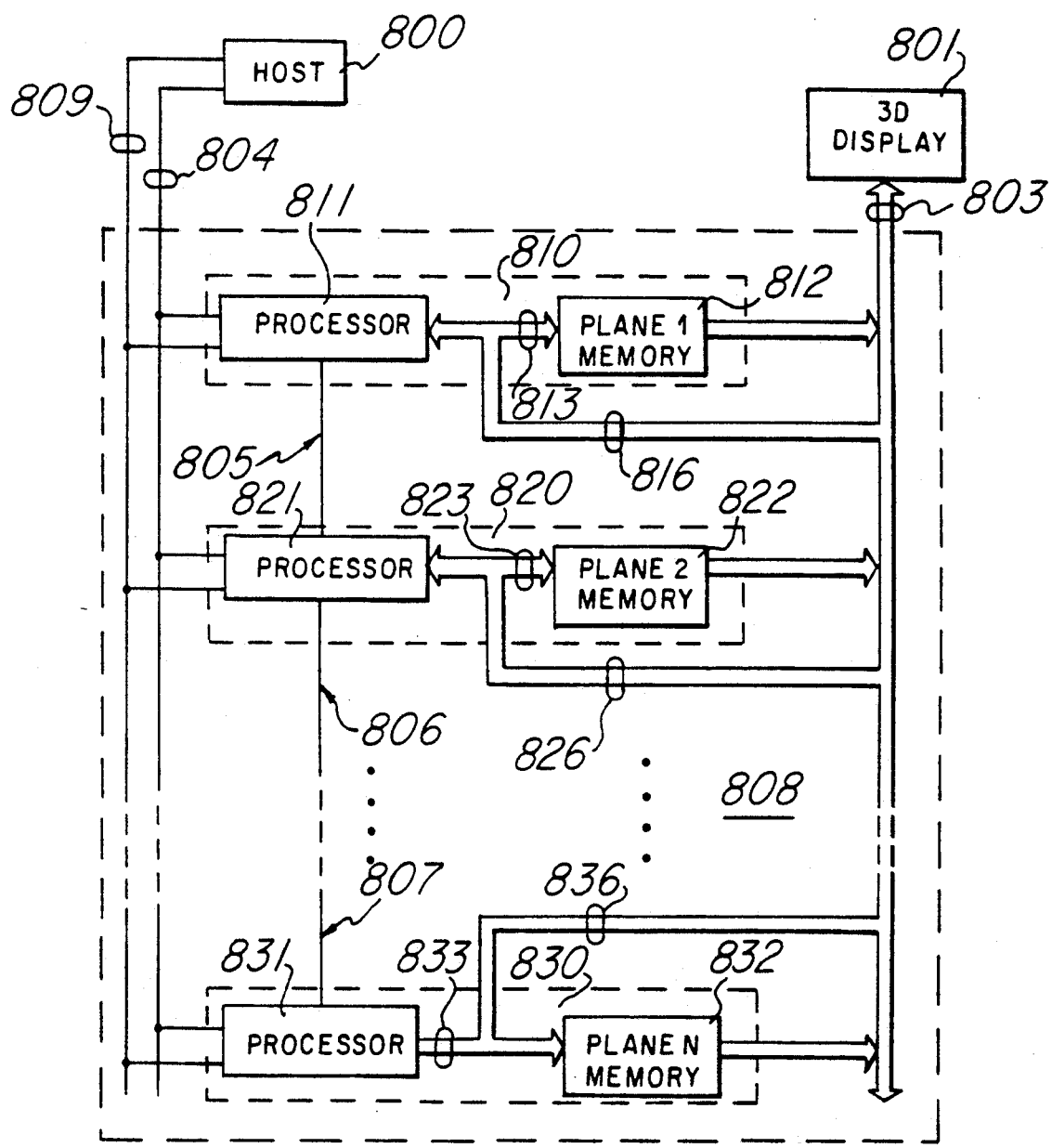
FIG. 16 shows a multi-dimensional array processor.

The beam expanders and lens systems of FIG. 11 could be replaced by the serrated mirrors of FIGS. 6 and 7. Sensors 655–660 are provided to detect radiation from or generated by the pointer 635. More or fewer sensors could be provided as necessary. In one embodiment, the pointer produces an energy beam at one frequency which interacts with another energy beam within the display. This interaction is detected by sensors to determine the line of the pointer through the display 612. In another embodiment, the emissions of the pointer is detected by sensors 655–660 directly to determine the line along which the pointer 635 is pointing into display 612. The system 610 of FIG. 16 is useful for hostile environments such as airplanes and tanks. The display 610 could be solid or gas with a cubic enclosure. The display could be of any convenient shape, for example spherical. The display 610 can have a coating on either its inner or outer surface between the user and the display which is transparent to the visible light produced within the display, and absorbs or reflects the energy beams directed to cause luminesces. The coating and the multi-frequency sensitive material can be utilized as the display 320 shown in FIGS. 6 and 7.

A type of pointer suitable for use with the digitized video system 610 of FIG. 11 is shown in FIGS. 12 and 13. Pointer 710 shown in FIGS. 12 and 13 has several buttons 712–714, which can be utilized to provided an encoded input to display 612. The front of pointer 710 is triangular in shape with beam generators 718–720 which can be IR devices. The output from generators 718–720 can be detected by sensors 655–660 to determine the line along which the pointer is directed into display 612. Buttons 712–715 can provide information which is then encoded to be broadcasted by generators 718–720, for example, by turning the generators in different sequences or at different frequencies or both when a particular button is pressed. Buttons 712 and 713 could indicate that the distance of interest within the display is further or closer, respectively. Button 714 could indicate that a drag should be performed and button 715 could lock and unlock the cursor. Hand grips 725 could be provided. The cursor provided with the display could be the entire line of the pointer through the display with a point highlighted to indicate distance. The cursor could be an visible XYZ axis with one axis along the line of the pointer or an visible XYZ axis which is oriented with the display.

FIG. 14 shows another pointer 730 which is hinged about pivot 732. Grips 734 can be provided. Buttons 736 similar to buttons 712–715 are provided. The beam generators 739 and 740 are provided at the ends of the segments 743 and 744. Segments 743 and 744 are pivoted about pivot 732 which can move the point at which beams 466 and 467 coincide. Thus beams 466 and 467 could be of different frequencies which cause a multi-frequency sensitive material to luminesce which is detected by sensors 655–660.

Another pointer 750 is shown in FIG. 15. This pointer 750 has a trigger 752 and an elongated body 753. Buttons 754 and 755 are provided similar to buttons 714 and 715, respectively. Grips 758 can be provided. Trigger 752 alters the angle of beams 760 and 761, which alters the distance at which the beams coincide. For example the closer the trigger is moved toward body 753 the beam intersect is moved closer to the body. The beams are generated by beam generators; only beam generator 763 is shown in FIG. 15. The beam generators can be similar to beam generators 739 and 740 of FIG. 14.

FIG. 16 illustrates a multi-dimensional array processor (MAP) 808 coupled to a host processor 800 and a 3 dimensional display 801. The host 800 may include any type of computer system such as a personal computer, minicomputer, or even just a receiver system for broadcast information. The 3D display 801 may be of the type described above, that described below in connection with FIG. 17, or other suitable display types.

In the presently preferred embodiment of the invention, the display 801 displays the 3D image as N number of XY planes, thus forming an XYZ image. Other embodiments are of course possible without departing from the scope of the present invention. For example, the display may comprise a number of XYZ blocks with one (or more) MAPs per block. Alternatively, each processing cell (for example 810, 820, and 830) of the MAP may operate on an XYZ basis rather than the presently preferred plane basis.

The MAP 808 is generally composed of a plurality of processing cells (PCs) 810, 820, and 830. As stated, in the presently preferred embodiment, each processing cell operates on a XY plane of the N plane image. Only 3 processing cells 810, 820, and 830 are shown for illustration. PC 810 is for the first plane, PC 820 is for the second plane, and PC 830 is for the Nth plane of the image. In other embodiments, each PC may be responsible for several image planes.

Each processing cell 810, 820, and 830 includes a processor (811, 821, and 831 respectively) coupled via a bus (813, 823, and 833 respectively) to a plane memory (812, 822, and 832 respectively). The processors 811, 821, and 831 may be of several different types. For examples: digital signal processors (DSPs) such as the TMS 320C30; conventional microprocessors such as the TMS99000; or graphics signal processors (GSPs) such as the TMS34020 among others could be used. In the presently preferred embodiment, GSPs are used as they not only are programmable, but they are also designed to easily manipulate two dimensional (XY) data. Likewise, the memory used may be of different types. Video RAMs (such as the TMS4461), DRAMs, SRAMs, or other memories could be used. Preferably, the memory architecture is that of a two ported type. In the present embodiment, VRAMs are used as they are inherently dual ported with the normal memory interface used for processor buses 813, 823, and 833 and the high speed serial ports used for connecting to the display bus 803.

The host 800 communicates with each processor 811, 821, and 831 within the MAP simultaneously over the high level descriptor language (HDL) bus 809 and the control bus 804. Control bus 804 is used to signal when the host 800 may send another HDL command (as described below) and to synchronize the PCs with the display 801. Optionally, each processor may communicate with its neighbors via other buses. For example: processor 811 and processor 821 communicate over bus 805; processor 821 communicates with the processor for plane 3 (not shown) via bus 806; and the N-1 processor (not shown) communicates with processor 831 via bus 807. As will be seen, the interprocessor communication is useful in some 3 dimensional image manipulations.

An alternative embodiment (not shown) would have host 800 only communicating with processor 811. All instructions to other processors (such as 821 and 831) would be allowed to "ripple" through the interprocessor buses (805, 806, and 807).

Display bus 803 is used to provide display data to the 3D display 801. In the presently preferred embodiment, each PC (810, 820, and 830) is sequentially allowed to place an entire plane of display data on bus 803 before the next plane. For example: PC 810 places the first plane of image data on bus 803; next, PC 820 places the second plane of image data on bus 803; each PC following (not shown) also places its data on bus 803; finally, PC 830 places its plane on bus 803. The process then restarts. Of course, other sequences may be employed. In other embodiments, each PC may be responsible for a block of XYZ information and may place the entire block on bus 803, or interleave planes as display 801 may require. In any event, all of the image data is present on bus 803 at some point. Further, as display 801 must be frequently refreshed (preferably faster than the critical flicker frequency), all of the image data is available in a relatively short period of time.

As will be seen below, each PC must have available to it the information that is present in other planes. While this could be done via the interprocessor buses 805, 806, and 807, this would be relatively slow, particularly when the information must be provided from several planes away. Therefore each processor (811, 821, 831) also is coupled to display bus 803 via buses 816, 826, and 836 respectively. In the presently preferred embodiment, buses 816, 826 and 836 are coupled into the processor buses 813, 823, and 833 respectively. In another embodiment, each processor may have an additional port coupled to display bus 803. In still another embodiment, the plane memories 812, 822, and 833 could be used to buffer data from display bus 803.

The high level descriptor language (HDL) used by host 800 to control the PCs of the MAP can be broken down into three basic types. These include structure formation types (including arithmetic and logic operations on a predetermined set of points), fills, and moves (including rotates). All of these are performed in parallel as will be obvious from the descriptions below.

Structure formation can include types such as line drawing, fractal generation, logic operations such as XORs, box drawing, etc. For example, if a line is to be drawn for display on display 801, the following sequence occurs. Host 800 sends down a HDL command that specifies the type of instruction (i.e. line drawing) and a formula giving the parameters of the line. Each PC of MAP 808 simultaneously receives this command over HDL bus 809. All PCs, in parallel, evaluate the formula to decide if the plane for which that PC is responsible for is affected. If so, then the PC will hold a common control line of control bus 804 down until it is finished. This prevents host 800 from sending another command until all processing is finished. Each PC that must modify a point within its associated plane memory, will do so and then release the control line. When all PCs have finished, the control line will be allowed to rise and host 800 may issue another HDL command.

In the preferred embodiment, the control line is handled slightly differently. All PCs immediately hold the control line upon the receipt of a command and will release it when the PC is either finished or determines that the PC is not involved in the operation.

Fill instructions start in the same manner. Host 800 issues a fill HDL command to all PCs via bus 809. All PCs that immediately determine that they have to modify their respective planes will hold the control line of control bus 804 down. However, in this case, because this is a 3 dimensional fill, as a fill progresses in one plane, it may open "holes" or "leaks" in another plane that will force a PC that previously did not have to modify its plane, to do so. There are two presently preferred ways of informing previously uninvolved PCs that they have to modify their plane memories.

The first of these uses the interprocessor buses 805, 806, and 807. When a given PC determines that it must modify its associated plane memory, it then informs the neighboring PCs via the associated interprocessor bus that it is doing so. The neighboring PCs then also hold the control line down. When the given PC finishes, it informs the neighboring PCs of that fact and releases its hold on the control line. The neighboring PCs hold the line down and then look to see if they will have to modify their plane memory. In order to determine this, they will either examine the given PC's plane data as it passes on display bus 803, or they may request data directly from the given PC via the interprocessor bus. If the neighbors determine that they have no changes, then they will release the control line. If, on the other hand, changes are necessary, then they will inform their appropriate neighbors and the process described repeats itself.

The second technique obviates the need (at least for this case) of the interprocessor busses 805, 806, and 807. Each PC must not only be able to pull the control line of control bus 804 down, but it also must be able to read the status of the control line. This functions as follows. If a given PC determines from the HDL instruction (or as will be seen, from passing data on bus 803) that it must modify its plane memory, it will pull the control line down and modify its memory. When it is finished, it must continue to hold the control line down for at least one full cycle of all image data passing on bus 803. This allows the given PC to determine if it is really finished. In other words, if another plane has changed, then the given PC may also have to change again. If not, then the given PC will release the line. Any time the line is down after a HDL fill command, all PCs must constantly scan their neighbor's plane data passing on bus 803 to determine if they need to start modifying. If so, then they will hold down the line and repeat the above process.

The final class of HDL command is that of moves and rotates. The commands start in the same way. The Host 800 sends the command and all affected PCs hold the control line. In the case of just an XY move or rotate (i.e. no interplane moves or rotates), all processors can simultaneously perform the move in their associated plane and release the control line.

In the case of any move or rotate that involves the Z axis (i.e. requires interplane movement), all affected PCs hold the control line for at least one full image cycle of data passing on display bus 803. This is done so that the associated processors may buffer all of the interplane data that they will require. After the full image cycle, the affected PC processors may modify their associated plane memory and then stop holding the control line. No data is allowed to be modified until a full image cycle occurs so as to not contaminate data that another PC needs.

As can be seen from the above discussion, the architecture for a true 3 dimensional display processor is markedly different than that required for a processor designed to represent a 3 dimensional image on a 2 dimensional display. Computational power is not as critical, but data flow is far more critical. As a consequence, the processors used in the PC may be simpler and smaller and hence more amenable to being put on a single chip with the plane memory. Indeed, for many true 3D displays, the entire MAP may be implemented on a single substrate.

Figure 17:
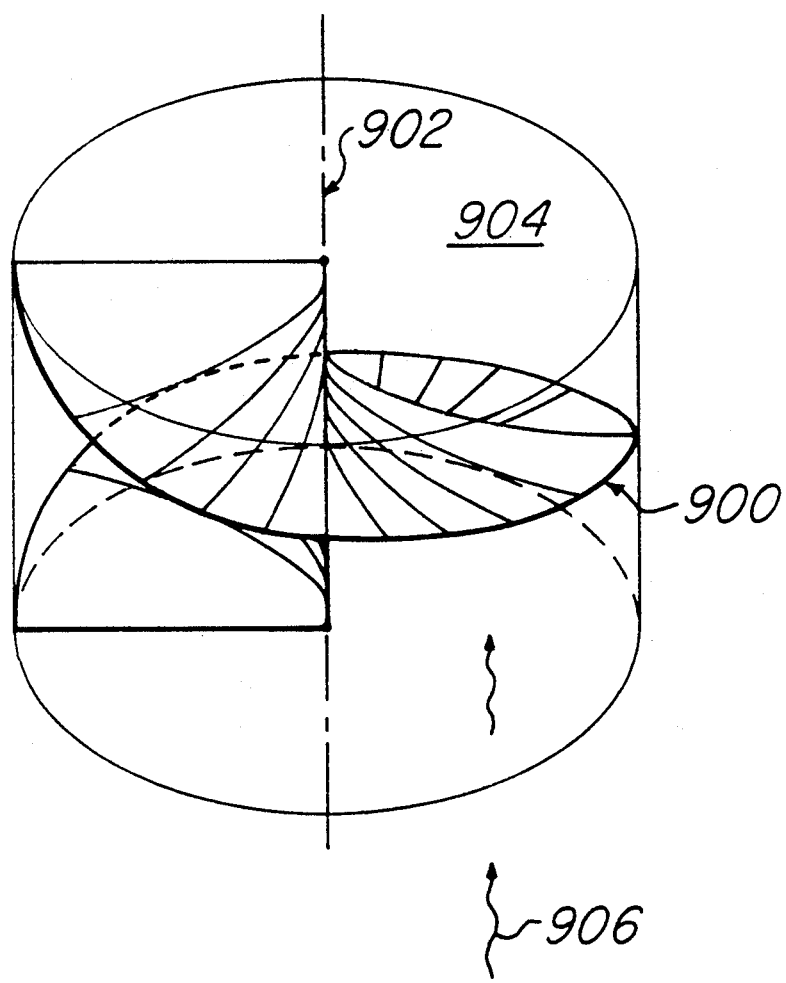
FIG. 17 shows a display with a movable surface.

A type of three dimensional display is shown in U.S. Pat. No. 5,042,909 by Garcia and Williams, issued Aug. 27, 1991, which is incorporated by reference hereinto. In FIG. 17, a surface with a 360 degree spiral surface 900 is rotated about an axis 902 to produce a three dimensional cylindrical space 904. The surface 900 extends from the axis 902 to the other edges of space 904 as shown in FIG. 17. As the surface 900 is rotated each point within space 904 is intersected once during each rotation. The surface 900 could be of any convenient shape, for example, a circular disk. A light beam is projected along optical path 906 to intersect with the surface 900. The image information can be provided by any of the systems shown herein utilizing a spatial light modulator along optical path 906.

It is an advantage of the present invention to provide a digitized video display at a desirable cost and of a high reliability.

It is another advantage of the present invention to provide a digitized video display which can be easily modified and/or manufactured for several different and incompatible television and video systems.

It is an advantage of the present invention to provide digitized video system to form a two dimensional display having a spatial light modulator directing individual light beams onto a display having a multi-frequency sensitive material from an energy source producing one or more energy beams at one or more frequencies.

Having described the invention in connection with certain specific embodiments thereof, it is to be understood that further modifications may now suggest themselves to those skilled in the art, it is intended to cover all such modifications as fall within the scope of the appended claims.

What is claimed is:

1. A digitized video system for two dimensional display comprising:
    (a) a two dimensional display including a multi-frequency sensitive material;
    (b) a spatial light modulator simultaneously directing a plurality of energy beams to said display at one or more frequencies; and
    (c) a source directing at least one energy beam at one or more frequencies at an angle to intersect all of said plurality of energy beams.

2. System as in claim 1 wherein said spatial light modulator comprises a one dimensional array.

3. System as in claim 1 wherein said spatial light modulator is two dimensional.

4. System as in claim 1 wherein said source directs one beam.

5. System as in claim 1 wherein said source directs several beams.

6. System as in claim 1 wherein said spatial light modulator includes:
    (a) an array of individual display cells;
    (b) each said display cell having at least two memory cells associate therewith, each said display cell selectively directly connected with one of said memory cells for control of said display cell;
    (c) a first decoder for addressing said memory cells for storing information therein; and
    (d) a second decoder for addressing said memory cells for selecting which of said memory cells is directly connected for control.

7. System as in claim 6 wherein each memory cell includes at least two components.

8. System as in claim 7 wherein one component is a transistor.

9. System as in claim 7 wherein one component stores capacitively.

10. System as in claim 7 wherein both components are transistors.

11. System as in claim 6 wherein said memory cell is implemented in CMOS.

12. System as in claim 6 wherein said memory cell is implemented in NMOS.

13. System as in claim 6 wherein said memory cell is implemented in PMOS.

14. System as in claim 6 wherein said second decoder simultaneously addresses one memory cell associated with substantially all of said display cells to display an image.

15. System as in claim 6 wherein said second decoder simultaneously addresses one memory cell associated with all of said display cells to display an image.

16. System as in claim 6 wherein said first decoder addresses a row of said array at a time.

17. A method for two dimensional display utilizing digitized video system comprising the steps of:
    (a) simultaneously directing a plurality of energy beams to a multi-frequency sensitive material at one or more frequencies; and
    (b) directing at least one energy beam at one or more frequencies at an angle intersecting said plurality of energy beams.

* * * * *